(12) United States Patent
Parsont

(10) Patent No.: US 11,996,010 B1
(45) Date of Patent: May 28, 2024

(54) PROCTORING SYSTEM FOR USE DURING TEST TAKING BY COMPUTER AND METHOD OF USE

(71) Applicant: Neil Parsont, Boca Raton, FL (US)

(72) Inventor: Neil Parsont, Boca Raton, FL (US)

( * ) Notice: Subject to any disclaimer, the term of this patent is extended or adjusted under 35 U.S.C. 154(b) by 0 days.

(21) Appl. No.: 17/529,243

(22) Filed: Nov. 17, 2021

Related U.S. Application Data

(60) Provisional application No. 63/120,185, filed on Dec. 1, 2020.

(51) Int. Cl.
*G09B 7/00* (2006.01)
*H04N 7/18* (2006.01)
*H04N 23/90* (2023.01)

(52) U.S. Cl.
CPC .............. *G09B 7/00* (2013.01); *H04N 7/181* (2013.01); *H04N 23/90* (2023.01)

(58) Field of Classification Search
CPC ............. G09B 7/00; G09B 5/00; G09B 19/00
See application file for complete search history.

(56) References Cited

U.S. PATENT DOCUMENTS

| | | | | |
|---|---|---|---|---|
| 8,233,672 | B2 * | 7/2012 | Matos .................... | G06K 9/00 382/116 |
| 2011/0223576 | A1 * | 9/2011 | Foster .................... | G09B 7/02 434/362 |
| 2011/0279228 | A1 * | 11/2011 | Kumar .................... | H04N 7/18 340/5.83 |
| 2012/0176220 | A1 * | 7/2012 | Garcia ................... | G06F 21/32 340/5.83 |
| 2013/0266926 | A1 * | 10/2013 | Cano .................... | G06F 12/1458 434/362 |
| 2014/0222995 | A1 * | 8/2014 | Razden .................... | G09B 7/02 709/224 |
| 2015/0037781 | A1 * | 2/2015 | Breed .................... | G09B 7/00 434/362 |
| 2015/0099256 | A1 * | 4/2015 | Liu .................... | G09B 7/02 434/353 |
| 2016/0307451 | A1 * | 10/2016 | Logan .................... | H04L 65/60 |
| 2017/0046966 | A1 * | 2/2017 | Velasquez .................... | G09B 7/02 |
| 2019/0199759 | A1 * | 6/2019 | Anderson .................... | G06Q 50/20 |
| 2022/0036489 | A1 * | 2/2022 | Brutsche .................... | G06Q 50/205 |

* cited by examiner

*Primary Examiner* — Kang Hu
*Assistant Examiner* — Correll T French
(74) *Attorney, Agent, or Firm* — Allen D Hertz, P. A.; Allen D. Hertz

(57) ABSTRACT

A system and a method of using the system for proctoring of a computer administered exam or test. The proctoring system includes software and at least two digital proctoring cameras arranged to capture at least: strokes on a keyboard, information displayed on a monitor, and activities of the examinee. The system can additionally capture video of the environment surrounding the testing computer. The information can be time stamped enabling synchronization thereof. The collected information is forwarded to a proctoring system, which can include artificial intelligence software to aid in monitoring the administration of the tests. A privacy screen can be employed to limit a viewing angle of the screen.

20 Claims, 8 Drawing Sheets

PROCTORING SYSTEM FOR USE DURING TEST TAKING BY COMPUTER AND METHOD OF USE

CROSS REFERENCE TO RELATED APPLICATIONS

This application is a Non-Provisional Utility Application claiming the benefit of U.S. Provisional Patent Application Ser. No. 63/120,185, filed on Dec. 1, 2020, which is incorporated by reference herein in its entirety.

FIELD OF THE INVENTION

The present disclosure generally relates to a proctoring system for use during test taking by a computer and an associated method of using the proctoring system.

BACKGROUND OF THE INVENTION

Examinations or testing can be accomplished using any of a variety of testing media in any of a variety of environments. Testing media can include oral testing, written testing, computerized testing, and the like. Tests are commonly applied in accordance to at least one of the following formats: computer testing, multiple choice, true/false questions, matching, short answer responses, essay questions, scantron testing, oral testing, open-book testing, and research projects.

Computerized testing continues to increase in use across various examination processes. This can include education facilities (grade school (elementary school, middle school, high school), colleges, universities, scholastic exams (SAT, ACT, etc.), professional accreditations (state BAR examinations, real estate accreditations, accounting accreditations, architecture accreditations, and the like), and any other suitable testing process. Computerized testing can be accomplished while testing is administered at an education facility, in a testing facility, and more recently using an examinee's or candidate's computer at the examinee's or candidate's workplace, home, or other location. Test results are based upon a legitimacy of the test examination process and affirmation against cheating.

Many methods are being implemented to deter cheating during online or computer examinations.

One method is an application of screen sharing, where a testing proctor (administrator) can view the screen of an examinee.

A second method employs a webcam (camera commonly integrated into a top cross-member of a monitor frame of a laptop computer or a desktop computer monitor). This arrangement has numerous limitations. as one person stated: "I have given some online college admissions tests and got qualified but my friend who hadn't studied also got qualified with much better score through cheating (he said "you just have to adjust the camera angle to show your face and not hands and keep your mobile device in a non visible area and just type the questions online quickly without taking much time and act like you are solving something") done that's all it took to cheat."

Other methods that can be implemented to cheat include:

Students cheat on exams by either using their phone outside of the viewing area of the standard built in webcam (as stated above).

Cheating can be accomplished by having a second person in the room take photos or look at the screen to help them.

Including elicit notes on notes or other paperwork.

Use unapproved notes adhered to monitor using a small piece of paper with a re-adherable strip of glue on its back, made for temporarily attaching notes to documents and other surfaces.

Arranging to send a fake camera feed in place of the digital proctoring camera.

Taking notes pertaining to test questions and/or test answers to aid others that might take the same or similar test during a future test period. The notes can be taken on paper, on the computer, or using any other suitable manner.

What is desired is an arrangement of devices creating a system which significantly limits an examinee from cheating during an examination given through a computerized testing process.

BRIEF SUMMARY OF THE INVENTION

The present disclosure is generally directed to a proctoring system for monitoring an examinee during administration of a test, where the test is administered over a computer.

In a first aspect, the proctoring system includes:
a first digital proctoring camera arranged to have digital communication with a proctor monitoring system;
a second digital proctoring camera arranged to have digital communication with the proctor monitoring system; and
proctoring software configured to interface with the first digital proctoring camera and the second digital proctoring camera,
wherein the first digital proctoring camera in an orientation to capture video of the examinee's keyboard and a portion of the examinee, including at least one of an examinee's hands and an examinee's face,
wherein the second digital proctoring camera in an orientation to capture video of a monitor screen of the examinee's computer and at least a portion of a desk supporting the examinee's computer.

In a second aspect, the proctoring system includes:
a test proctoring kit, the test proctoring kit comprising:
a first digital proctoring camera in one of direct or indirect digital communication with a proctor computer; and
a second digital proctoring camera in one of direct or indirect digital communication with the proctor computer,
wherein the first digital proctoring camera is positioned enabling acquisition of video of the examinee's keyboard and a portion of the examinee, including at least one of (a) an examinee's face and (b) at least one of an examinee's hands,
wherein the second digital proctoring camera is positioned enabling acquisition of video of a monitor screen of the examinee's computer and at least a portion of a desk supporting the examinee's computer, wherein the second digital proctoring camera is arranged to capture video using a first viewing angle,
the proctoring system employing monitoring steps of:
accessing proctoring software;
initiating proctoring software;
acquiring video using the first digital proctoring camera;
conveying video acquired using the first digital proctoring camera to the proctor computer;
acquiring video using the second digital proctoring camera; and conveying video acquired using the second digital proctoring camera to the proctor computer,
wherein the monitoring steps are accomplished by at least one of (a) a processor integral with the examinee's computer and (b) a processor integral with the proctoring computer.

In a second aspect, the first digital proctoring camera is integrated into a monitor of the examinee's computer.

In another aspect, the first digital proctoring camera is carried by the monitor of the examinee's computer.

In yet another aspect, the first digital proctoring camera is positioned above the monitor of the examinee's computer.

In yet another aspect, the first digital proctoring camera is positioned above the monitor of the examinee's computer in a central position.

In yet another aspect, the first digital proctoring camera is positioned above the monitor of the examinee's computer.

In yet another aspect, the first digital proctoring camera is oriented to acquire video of a keyboard associated with the examinee's computer, wherein the keyboard is supported by a keyboard tray.

In yet another aspect, the first digital proctoring camera is oriented to acquire video of a keyboard associated with the examinee's computer, wherein the keyboard is supported by a keyboard tray and the keyboard tray is located below a desktop of the desk supporting the examinee's computer.

In yet another aspect, the first digital proctoring camera is positioned enabling acquisition of video of the examinee's keyboard and the portion of the examinee, including (a) the examinee's face and (b) at least one of the examinee's hands.

In yet another aspect, the first digital proctoring camera is positioned enabling acquisition of video of the examinee's keyboard and the portion of the examinee, including (a) the examinee's face and (b) both of the examinee's hands.

In yet another aspect, the second digital proctoring camera is positioned enabling acquisition of video of at least one of the examinee's hands.

In yet another aspect, the second digital proctoring camera is positioned enabling acquisition of video of both of the examinee's hands.

In yet another aspect, the second digital proctoring camera is positioned enabling acquisition of video of the keyboard and at least one of the examinee's hands.

In yet another aspect, the second digital proctoring camera is positioned enabling acquisition of video of the keyboard and both of the examinee's hands.

In yet another aspect, the proctoring system further comprising:
a third digital proctoring camera in one of direct or indirect digital communication with the proctor computer,
wherein the third digital proctoring camera is positioned enabling acquisition of video of the monitor screen of the examinee's computer and at least a second portion of the desk supporting the examinee's computer, wherein the third digital proctoring camera is arranged to capture video using a second viewing angle;
the proctoring system further comprising additional monitoring steps of:
acquiring video using the third digital proctoring camera; and
conveying video acquired using the third digital proctoring camera to the proctor computer,
wherein the additional monitoring steps are accomplished by at least one of (a) a processor integral with the examinee's computer and (b) a processor integral with the proctoring computer.

In yet another aspect, at least one of the second digital proctoring camera and the third digital proctoring camera is positioned enabling acquisition of video of at least one of the examinee's hands.

In yet another aspect, at least one of the second digital proctoring camera and the third digital proctoring camera is positioned enabling acquisition of video of both of the examinee's hands.

In yet another aspect, at least one of the second digital proctoring camera and the third digital proctoring camera is positioned enabling acquisition of video of the keyboard and at least one of the examinee's hands.

In yet another aspect, at least one of the second digital proctoring camera and the third digital proctoring camera is positioned enabling acquisition of video of the keyboard and both of the examinee's hands.

In yet another aspect, the first digital proctoring camera is oriented to acquire video of an examinee's face.

In yet another aspect, the first digital proctoring camera is oriented to acquire video of an examinee's eyes.

In yet another aspect, the first digital proctoring camera is oriented to acquire video of the examinee's eyes, wherein the process further comprises eye tracking software.

In yet another aspect, the second digital proctoring camera is oriented to capture video of the monitor screen and at least a portion of a desk supporting the examinee's computer.

In yet another aspect, the second digital proctoring camera is oriented to capture video of the screen and an entire portion of the desk supporting the examinee's computer to one side of the examinee's keyboard.

In yet another aspect, the second digital proctoring camera is oriented to capture video of the screen and an entire desktop of the desk supporting the examinee's computer to one side of the examinee's keyboard.

In yet another aspect, the proctoring system further includes a third digital proctoring camera having connectivity to a proctor monitoring system.

In yet another aspect, the second digital proctoring camera is oriented to capture video of the monitor screen and a first portion of the desk supporting the examinee's computer and the third digital proctoring camera is oriented to capture video of the monitor screen and a second portion of the desk supporting the examinee's computer.

In yet another aspect, the second digital proctoring camera is oriented to capture video of the monitor screen and a first portion of the desk supporting the examinee's computer and the third digital proctoring camera is oriented to capture video of the monitor screen and a second portion of the desk supporting the examinee's computer, wherein the first portion of the desk and the second portion of the desk collectively capture video of the entire desktop of the desk supporting the examinee's computer.

In yet another aspect, at least one of the first digital proctoring camera, the second digital proctoring camera, and the third digital proctoring camera is connected to the examinee's computer.

In yet another aspect, at least one of the first digital proctoring camera, the second digital proctoring camera, and the third digital proctoring camera is connected to the examinee's computer using a Universal Serial Bus (USB) protocol.

In yet another aspect, at least one of the first digital proctoring camera, the second digital proctoring camera, and the third digital proctoring camera is connected to the examinee's computer using a Bluetooth protocol.

In yet another aspect, at least one of the first digital proctoring camera, the second digital proctoring camera, and the third digital proctoring camera is connected to the examinee's computer using a Wi-Fi protocol.

In yet another aspect, at least one of the first digital proctoring camera, the second digital proctoring camera, and the third digital proctoring camera is connected to a proctoring computer.

In yet another aspect, at least one of the first digital proctoring camera, the second digital proctoring camera, and the third digital proctoring camera is connected to a proctoring computer, wherein the proctoring computer is independent of the examinee's computer.

In yet another aspect, at least one of the first digital proctoring camera, the second digital proctoring camera, and the third digital proctoring camera is connected to a proctoring computer using a Universal Serial Bus (USB) protocol.

In yet another aspect, at least one of the first digital proctoring camera, the second digital proctoring camera, and the third digital proctoring camera is connected to the proctoring computer using a Bluetooth protocol.

In yet another aspect, at least one of the first digital proctoring camera, the second digital proctoring camera, and the third digital proctoring camera is connected to the proctoring computer using a Wi-Fi protocol.

In yet another aspect, at least one of the first digital proctoring camera, the second digital proctoring camera, and the third digital proctoring camera is connected to the router.

In yet another aspect, at least one of the first digital proctoring camera, the second digital proctoring camera, and the third digital proctoring camera is connected to the router using a Universal Serial Bus (USB) protocol.

In yet another aspect, at least one of the first digital proctoring camera, the second digital proctoring camera, and the third digital proctoring camera is connected to the router using a Bluetooth protocol.

In yet another aspect, at least one of the first digital proctoring camera, the second digital proctoring camera, and the third digital proctoring camera is connected to the router using a Wi-Fi protocol.

In yet another aspect, at least one of the first digital proctoring camera, the second digital proctoring camera, and the third digital proctoring camera is supported by a stand.

In yet another aspect, at least one of the first digital proctoring camera, the second digital proctoring camera, and the third digital proctoring camera is supported by a stand, wherein the stand is secured to a desktop of the desk supporting the examinee's computer.

In yet another aspect, at least one of the first digital proctoring camera, the second digital proctoring camera, and the third digital proctoring camera is supported by a stand, wherein the stand is secured to a desktop of the desk supporting the examinee's computer using a clamping system.

In yet another aspect, at least one of the first digital proctoring camera, the second digital proctoring camera, and the third digital proctoring camera is supported by a stand, wherein the stand is secured to a desktop of the desk supporting the examinee's computer using a suction cup arrangement.

In yet another aspect, at least one of the first digital proctoring camera, the second digital proctoring camera, and the third digital proctoring camera further comprising at least one motion sensor.

In yet another aspect, at least one of the first digital proctoring camera, the second digital proctoring camera, and the third digital proctoring camera further comprising at least one motion sensor, wherein the motion sensor identifies when the at least one of the first digital proctoring camera, the second digital proctoring camera, and the third digital proctoring camera is moved.

In yet another aspect, at least one of the first digital proctoring camera, the second digital proctoring camera, and the third digital proctoring camera further comprising at least one motion sensor, wherein the motion sensor identifies when an object in a proximity of the camera moves.

In yet another aspect, at least one of the first digital proctoring camera, the second digital proctoring camera, and the third digital proctoring camera further comprising at least one motion sensor, wherein the motion sensor identifies when an object other than the examinee in a proximity of the camera moves.

In yet another aspect, the system further comprising at least one microphone.

In yet another aspect, the router is connected to the Internet.

In yet another aspect, the system further comprising reference markers to aid in identifying a viewing boundary of at least one digital proctoring camera.

In yet another aspect, the reference markers are placed upon at least two corners of the examinee's monitor.

In yet another aspect, the reference markers are placed upon at least two corners of the examinee's monitor, wherein the at least two corners includes upper corners of the examinee's monitor.

In yet another aspect, the reference markers are placed upon at least two corners of the examinee's keyboard.

In yet another aspect, the reference markers are placed upon at least two corners of the examinee's keyboard, wherein the at least two corners includes proximal corners of the examinee's keyboard.

In yet another aspect, the reference markers are placed upon at least two corners of the examinee's keyboard, wherein the at least two corners includes distal corners of the examinee's keyboard.

In yet another aspect, at least one digital proctoring camera is oriented to obtain video of a pointing device used in conjunction with the Examinee's computer.

In yet another aspect, at least one digital proctoring camera is oriented to obtain video of the pointing device used in conjunction with the Examinee's computer, wherein the pointing device is a mouse.

In yet another aspect, at least one digital proctoring camera is oriented to obtain video of the pointing device used in conjunction with the Examinee's computer, wherein the pointing device is a trackball.

In yet another aspect, at least one digital proctoring camera is oriented to obtain video of the pointing device used in conjunction with the Examinee's computer, wherein the pointing device is a track pad.

In yet another aspect, at least one digital proctoring camera is oriented to obtain video of a pen tablet.

In yet another aspect, at least one digital proctoring camera is oriented to obtain video of a pen tablet, wherein the pen tablet includes a touch pen and an input contact pad.

In yet another aspect, at least one digital proctoring camera is oriented to obtain video of a pen tablet, wherein the pen tablet includes a touch pen and an input contact pad, the touch pen being tethered to the contact pad.

In yet another aspect, the proctoring software includes a function to record keystrokes of the keyboard associated with the examinee's computer.

In yet another aspect, the proctoring software includes a function to timestamp and record keystrokes of the keyboard associated with the examinee's computer.

In yet another aspect, the proctoring software includes a function to display a reference time on the monitor, wherein the reference time is synchronized with video recorded by at least one of the digital proctoring cameras.

In yet another aspect, the proctoring software includes a function to display a reference time on the monitor, wherein the reference time is synchronized with video recorded by each of the digital proctoring cameras.

In yet another aspect, the proctoring software includes a function to compare entries displayed on the monitor with the keystrokes made by the examinee.

In yet another aspect, the proctoring software includes a function to compare entries displayed on the monitor with the keystrokes made by the examinee, wherein the keystrokes are determined by computer software and the entries displayed upon the monitor are determined using captured digital video and optical character recognition (OCR) software.

In yet another aspect, the proctoring software includes a function to compare the displayed reference time on the monitor with the timestamp of the keystrokes made by the examinee.

In yet another aspect, the proctoring software includes a function to identify articles located on a desktop of the desk supporting the examinee's computer.

In yet another aspect, the proctoring software includes a function to identify when at least one hand of an examinee is moved away from the keyboard associated with the examinee's computer.

In yet another aspect, a testing station used by the examinee is located against at least one wall.

In yet another aspect, a test to be taken is obtained from a testing computer.

In yet another aspect, a test to be taken is obtained from a testing computer, wherein the testing computer is in digital communication with a network.

In yet another aspect, a test to be taken is obtained from a testing computer, wherein the testing computer is in digital communication with a network, wherein the network is an Internet.

In yet another aspect, each test obtained from a testing computer is identified and associated with the respective examinee.

In yet another aspect, each test obtained from a testing computer is identified and associated with the respective examinee, wherein the association and respective information is recorded.

In yet another aspect, each test obtained from a testing computer is identified and associated with the respective examinee, wherein the association and respective information is recorded on the testing computer.

In yet another aspect, each test obtained from a testing computer is identified and associated with the respective examinee, wherein the association and respective information is recorded on a proctoring computer.

In yet another aspect, a test to be taken is obtained from a testing computer, wherein the proctoring computer is in digital communication with a network.

In yet another aspect, a test to be taken is obtained from a testing computer, wherein the proctoring computer is in digital communication with a network, wherein the network is an Internet.

In yet another aspect, proctoring software is obtained from the proctoring computer.

In yet another aspect, proctoring software operates remotely from the proctoring computer.

In yet another aspect, the network is a private network.

In yet another aspect, the network is a secure, private network.

In yet another aspect, the network is a public network.

In yet another aspect, the network includes the Internet.

In yet another aspect, proctoring is accomplished by monitoring video provided by each of the digital proctoring cameras arranged to monitor each examinee.

In yet another aspect, proctoring is accomplished by monitoring video provided by each of the digital proctoring cameras arranged to monitor each examinee, wherein the video associated with each examinee is presented as a cluster.

In yet another aspect, the proctoring system further comprising artificial intelligence software.

In yet another aspect, the proctoring system further comprising a privacy filter.

In yet another aspect, the proctoring system further comprising a privacy filter, wherein the privacy filter reduces a viewing angle of the monitor used in conjunction with the examinee's computer.

In yet another aspect, the proctoring system further comprising a privacy filter, wherein the privacy filter is sized to be temporarily secured to the monitor used in conjunction with the examinee's computer.

In yet another aspect, the privacy filter is secured to the monitor using a strap.

In yet another aspect, the privacy filter is secured to the monitor using an elastic strap.

In yet another aspect, the privacy filter is secured to the monitor using a clamp.

In yet another aspect, the privacy filter is secured to the monitor using an adhesive.

In yet another aspect, the present invention discloses a method of use for proctoring a testing process, wherein the test is taken in an examinee's computer, the method comprising steps of:
  obtaining a test proctoring kit, the test proctoring kit comprising:
    a first digital proctoring camera arranged to have digital communication with to a proctor monitoring system, and
    a second digital proctoring camera arranged to have digital communication with to the proctor monitoring system;
  arranging the first digital proctoring camera in an orientation to capture video of the examinee's keyboard and a portion of the examinee, including the examinee's hands and face;
  arranging the second digital proctoring camera in an orientation to capture video of a monitor screen of the examinee's computer and at least a portion of a desk supporting the examinee's computer;
  accessing proctoring software; and
  initiating proctoring software.

In yet another aspect, the method further comprises a step of verifying the arrangement of the first digital proctoring camera with a proctor and verifying the arrangement of the second digital proctoring camera with the proctor.

In yet another aspect, the method further comprises a step of adjusting an arrangement of at least one of the arrangement of the first digital proctoring camera and the arrangement of the second digital proctoring camera when instructed by the proctor.

In yet another aspect, wherein the step of arranging the first digital proctoring camera in an orientation to capture video of the examinee's keyboard and a portion of the examinee, including at least one of an examinee's hands and an examinee's face arranges the first digital proctoring camera in the orientation to capture video of the examinee's keyboard and the portion of the examinee, including each of the examinee's hands and the examinee's face.

In yet another aspect, further comprising a step of arranging a third digital proctoring camera in an orientation to capture video of the monitor screen of the examinee's computer and at least a portion of the desk supporting the examinee's computer,
- wherein the second digital proctoring camera is arranged to capture video using a first viewing angle,
- wherein the third digital proctoring camera is arranged to capture video using a second viewing angle,
- wherein the first viewing angle and the second viewing angle differ from one another.

In yet another aspect, further comprising a step of utilizing artificial intelligence by a processor of the proctor monitor system to identify improprieties during administration of an exam.

In yet another aspect, further comprising a step of distributing an exam from an examination computer to each examinee's computer via a commonly accessible network.

In yet another aspect, wherein a privacy filter screen is placed over a display of the examinee's computer, the method further comprising a step of distributing an exam from an examination computer to each examinee's computer via a commonly accessible network.

In yet another aspect, the method further comprises a step of scanning or digitizing all papers the examinee intends to use during the process of taking the test, then providing a copy of the digital images of all papers to the proctor.

In yet another aspect, the method further comprises a step of presenting each electronic device to the proctor.

In yet another aspect, the method further comprises a step of powering on then presenting each electronic device to the proctor.

In yet another aspect, wherein the step of step of presenting each electronic device to the proctor includes a step of presenting a Smartphone to the proctor.

In yet another aspect, wherein the step of step of presenting each electronic device to the proctor includes a step of confirming that the Smartphone presented to the proctor is the Examinee's Smartphone.

In yet another aspect, wherein the step of step of presenting each electronic device to the proctor includes a step of confirming that the Smartphone presented to the proctor is the examinee's Smartphone, wherein the step is accomplished by sending a message directly to the examinee's Smartphone and the examinee presenting the message to the proctor.

In yet another aspect, wherein the step of step of presenting each electronic device to the proctor includes a step of confirming that the Smartphone presented to the proctor is the examinee's Smartphone, wherein the step is accomplished by sending a text message directly to the examinee's Smartphone and the examinee presenting the text message to the proctor.

In yet another aspect, wherein the step of step of presenting each electronic device to the proctor includes a step of confirming that the Smartphone presented to the proctor is the examinee's Smartphone, wherein the step is accomplished by sending a push message directly to the examinee's Smartphone and the examinee presenting the push message to the proctor.

In yet another aspect, wherein the step of step of presenting each electronic device to the proctor includes a step of confirming that the Smartphone presented to the proctor is the examinee's Smartphone, wherein the step is accomplished by sending an email message directly to the examinee's Smartphone and the examinee presenting the email message to the proctor.

In yet another aspect, wherein the step of step of presenting each electronic device to the proctor includes a step of presenting a calculator to the proctor.

In yet another aspect, the method further comprises a step of accessing a subject test.

In yet another aspect, the method further comprises a step of downloading the accessed subject test.

In yet another aspect, the method further comprises a step of administering the downloaded subject test.

In yet another aspect, the method further comprises a step of taking the downloaded subject test.

In yet another aspect, the method further comprises a step of accessing the subject test via a website.

In yet another aspect, the method further comprises a step of administering the subject test via a website.

In yet another aspect, the method further comprises a step of taking the subject test via a website.

In yet another aspect, the method further comprises a step of monitoring the administration of the test by the proctor.

In yet another aspect, the method further comprises a step of acquiring video of the computer display during the test administration period.

In yet another aspect, the method further comprises a step of acquiring video of each computer display during the test administration period.

In yet another aspect, the method further comprises a step of acquiring video of each computer display of multiple computer displays during the test administration period.

In yet another aspect, the method further comprises a step of acquiring video of the environment surrounding the test administration station during the test administration period.

In yet another aspect, the method further comprises a step of acquiring video of the desktop of the test administration station during the test administration period.

In yet another aspect, the method further comprises a step of acquiring video of the examinee's hands during the test administration period.

In yet another aspect, the method further comprises a step of acquiring video of the examinee's face during the test administration period.

In yet another aspect, the method further comprises a step of acquiring video of the examinee's eyes during the test administration period.

In yet another aspect, the method further comprises a step of monitoring the administration of the test using artificial intelligence.

In yet another aspect, the method further comprises a step of monitoring the administration of the test using artificial intelligence, wherein the artificial intelligence is programmed to determine anomalies during the test taking process.

In yet another aspect, wherein the step of determining anomalies during the test taking process includes at least one of:
- use of an electronic device that differs from those previously presented to the proctor,
- use of a paper that differs from those previously presented to the proctor,
- movement of the examinee away from a station where the test is being administered,
- movement of one or more of the digital proctoring cameras,
- a condition where the keystrokes and the display on the monitor are not synchronized,
- recognition of any other individuals in an area of the station where the test is being administered,
- recognition of a sound in the area of the station where the test is being administered, wherein the sound is an anomaly from sounds associated with a taking of a test on a computer, and
- recognition when a time displayed on the monitor of the examinee's computer differs from a time at the proctoring station.

In yet another aspect, the method further comprises a step of monitoring the administration of the test using a combination of the proctor and artificial intelligence.

In yet another aspect, the method further comprises a step of taking the administered test.

In yet another aspect, wherein the step of taking the administered test is accomplished by responding to instructions provided by the test.

In yet another aspect, wherein the step of taking the administered test is accomplished by answering questions presented by the test.

In yet another aspect, wherein the step of taking the administered test is accomplished by answering multiple choice questions presented by the test.

In yet another aspect, wherein the step of taking the administered test is accomplished by answering fill in the blank questions presented by the test.

In yet another aspect, wherein the step of taking the administered test is accomplished by answering essay questions presented by the test.

In yet another aspect, wherein the step of taking the administered test is accomplished by answering math questions presented by the test.

In yet another aspect, wherein the step of taking the administered test is accomplished by answering math questions presented by the test using the pen tablet to execute and document mathematical steps used to determine an answer to one or more math questions.

In yet another aspect, the method further comprises a step of notifying the proctor that the examinee has completed the administered test.

In yet another aspect, the method further comprises a step of scanning or digitizing all papers the examinee used or had access to during the process of taking the test, then providing a copy of the digital images of all papers to the proctor, wherein this step is accomplished after completion of the test.

In yet another aspect, the method further comprises a step of recording all video captured during the administration of the test.

In yet another aspect, the method further comprises a step of recording the display presented on the monitor during the administration of the test.

In yet another aspect, the method further comprises a step of recording the keystrokes applied during the administration of the test.

In yet another aspect, the method further comprises a step of recording all movements associated with each pointer device during the administration of the test.

In yet another aspect, the method further comprises a step of installing a privacy screen.

In yet another aspect, the method further comprises a step of installing a privacy screen, wherein the privacy screen reducing a viewing angle of the display of the monitor.

In yet another aspect, the method further comprises a step of installing a privacy screen, wherein the step of installing the privacy screen is accomplished by securing the privacy screen to the monitor.

In yet another aspect, the method further comprises a step of installing a privacy screen, wherein the step of installing the privacy screen is accomplished by securing the privacy screen to the monitor using a strap.

In yet another aspect, the method further comprises a step of installing a privacy screen, wherein the step of installing the privacy screen is accomplished by securing the privacy screen to the monitor using an elastic strap.

In yet another aspect, the method further comprises a step of installing a privacy screen, wherein the step of installing the privacy screen is accomplished by securing the privacy screen to the monitor using a clamp.

In yet another aspect, the method further comprises a step of installing a privacy screen, wherein the step of installing the privacy screen is accomplished by securing the privacy screen to the monitor using an adhesive.

In yet another aspect, the method further comprises a step of installing a privacy screen, wherein the step of installing the privacy screen is accomplished by securing the privacy screen to the monitor using a double sided tape.

In yet another aspect, the method further comprises a step of applying reference markers to the display side of the monitor.

In yet another aspect, the method further comprises a step of applying reference markers to each of a right side of the display side of the monitor and a left side of the display side of the monitor.

In yet another aspect, the method further comprises a step of applying reference markers to each of a right upper corner of the display side of the monitor and a left upper corner of the display side of the monitor.

In yet another aspect, the method further comprises a step of applying reference markers to each of a right lower corner of the display side of the monitor and a left lower corner of the display side of the monitor.

In yet another aspect, the method further comprises a step of applying reference markers to each of a right side of the keyboard and a left side of the keyboard.

In yet another aspect, the method further comprises a step of applying reference markers to each of a right front corner of the keyboard and a left front corner of the keyboard.

In yet another aspect, the method further comprises a step of applying reference markers to each of a right rear corner of the keyboard and a left rear corner of the keyboard.

In yet another aspect, the method further comprises a step of applying reference markers to each of a right side of the desktop and a left side of the desktop.

In yet another aspect, the method further comprises a step of applying reference markers to each of a right front corner of the desktop and a left front corner of the desktop.

In yet another aspect, the method further comprises a step of applying reference markers to each of a right rear corner of the desktop and a left rear corner of the desktop.

In yet another aspect, the method further comprises a step of utilizing the reference markers to confirm that a viewing area of the digital proctoring camera is capturing images covering the minimum desired area.

In yet another aspect, the method further comprises a step of displaying video from each digital proctoring camera of at least one examinee on a proctoring monitor.

In yet another aspect, the method further comprises a step of displaying video from each digital proctoring camera of multiple examinees on the proctoring monitor.

In yet another aspect, the method further comprises a step of displaying video from each digital proctoring camera of at least one examinee and displaying an identification of the examinee at a location proximate the displayed video on the proctoring monitor.

In yet another aspect, the method further comprises a step of displaying video from each digital proctoring camera of multiple examinees in clusters and displaying an identification of each examinee at a location proximate each respective displayed video cluster on the proctoring monitor.

In yet another aspect, the method further comprises a step of displaying video from each digital proctoring camera of at least one examinee in a cluster and displaying the identification of the examinee at the location proximate the displayed video on the proctoring monitor.

In yet another aspect, the method further comprises a step of monitoring at least one examinee by watching video images captured by the digital proctoring cameras, the video images being displayed on a proctoring monitor on the proctoring monitor.

In yet another aspect, the method further comprises a step of presenting an alert to the proctor when the proctoring software determines an anomaly has occurred.

In yet another aspect, the method further comprises a step of presenting an alert to the proctor when the proctoring software determines an anomaly has occurred, wherein the alert is a visual alert.

In yet another aspect, the method further comprises a step of presenting an alert to the proctor when the proctoring software determines an anomaly has occurred, wherein the alert is a visual alert displayed on the proctoring monitor.

In yet another aspect, the method further comprises a step of presenting an alert to the proctor when the proctoring software determines an anomaly has occurred, wherein the alert is an audible alert.

In yet another aspect, the method further comprises a step of rewinding at least one video to determine appropriateness of actions of the examinee.

In yet another aspect, the method further comprises a step of rewinding at least one video to review the anomaly.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, in which.

Like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Administration of tests or exams has advanced over time. In the past, common practice for administering of tests was to provide a printed test to a group of examinees in one or more rooms within a test administration location, normally a single, open room with a number of spatially arranged desks. One or more proctors monitor the test administration location, usually walking around the spatially arranged desks during the examination period. Test administration has advanced to a current state, where more and more tests are taken on a computer. The introduction of the computer also introduces a higher risk for examinees to cheat on the test. In a majority of the cases, the examinee taking a test administered on a computer is located remotely from the proctor. The present invention provides a proctoring system and a method of implementation increasing an affectivity of a proctoring process when tests are administered over computers, and even more so when the computers are located remotely from the proctoring company.

Figure 1:
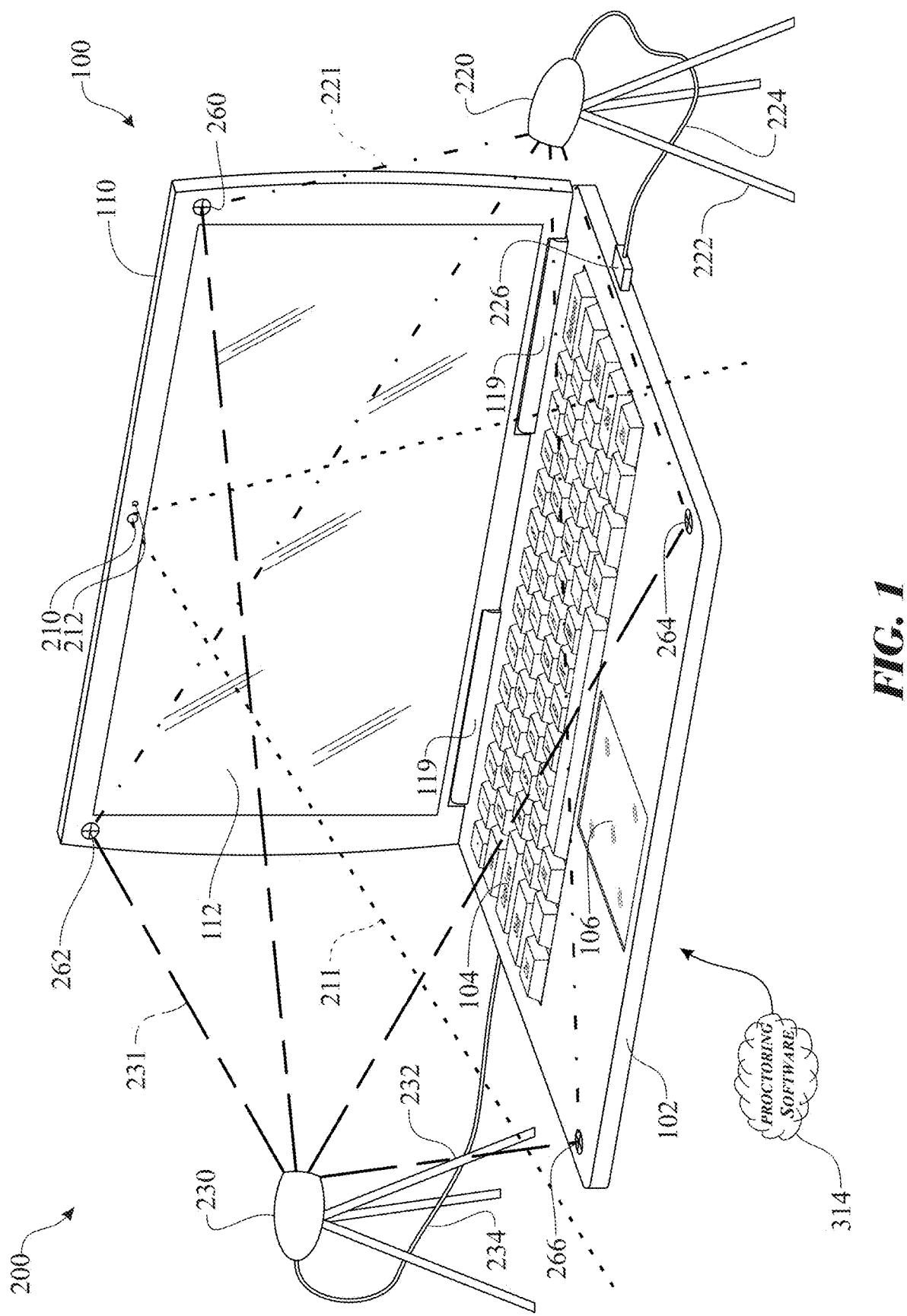
FIG. 1 presents an isometric front, top view of an exemplary test administration computer employing an exemplary test proctoring system.
Figure 4:
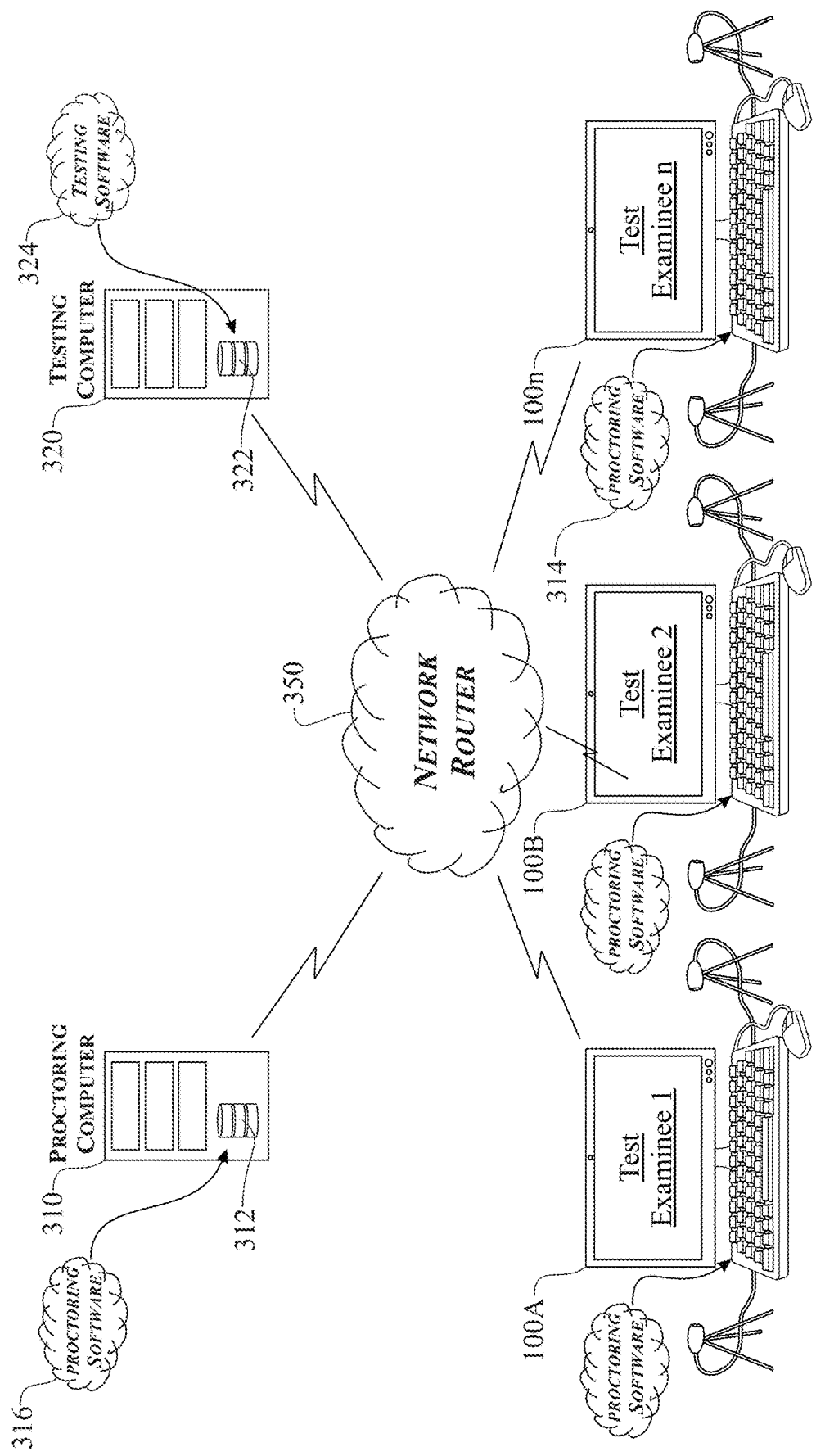
FIG. 4 presents a schematic diagram of an exemplary test administration and proctoring system.
Figure 5:
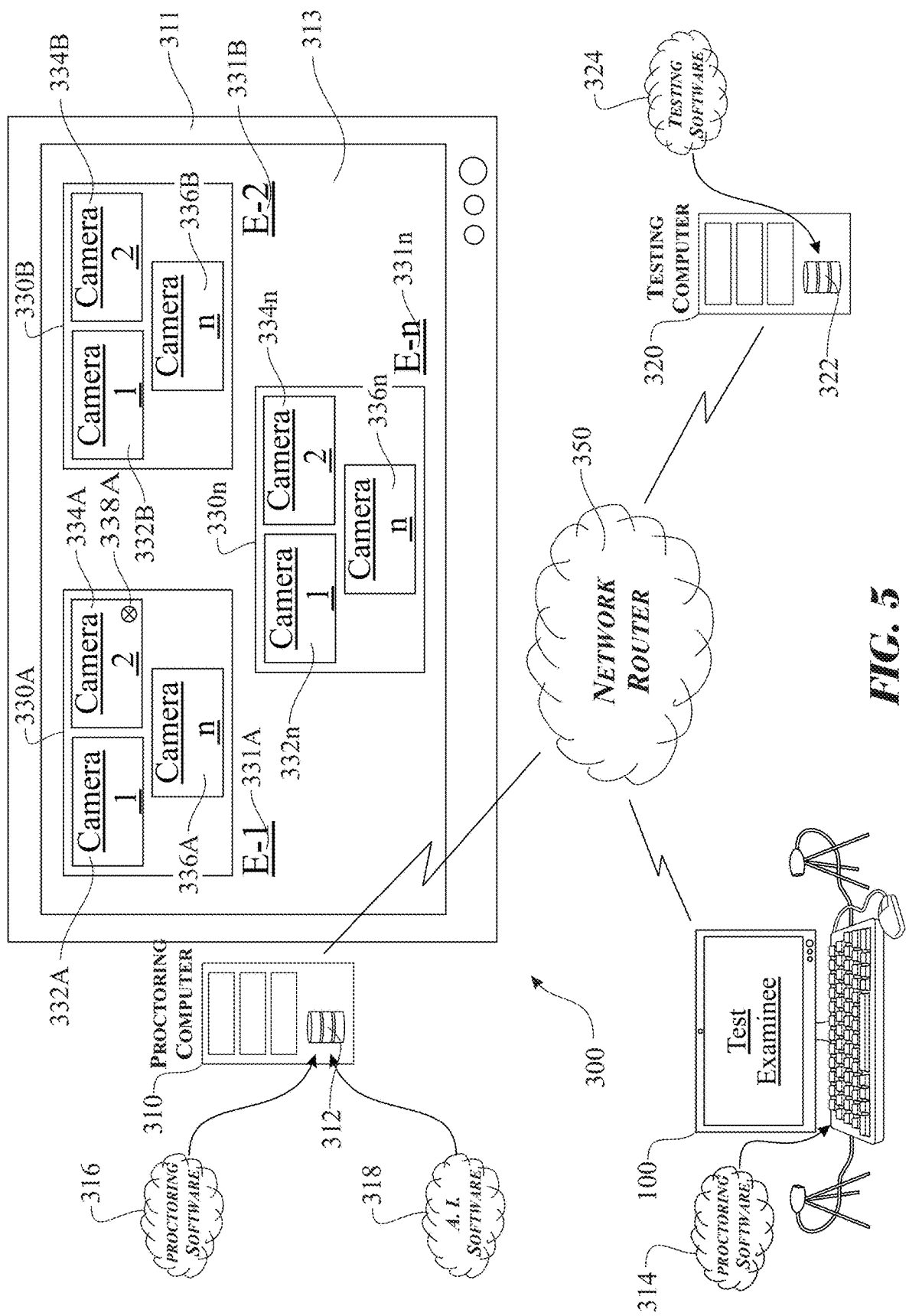
FIG. 5 presents a front elevation view of an exemplary proctoring system.

An exemplary proctoring acquisition system 200, introduced in FIG. 1, includes an integral webcam 210, a first digital proctoring camera 220, and proctoring software 190. The exemplary proctoring acquisition system 200 additionally includes a second digital proctoring camera 230. The exemplary proctoring acquisition system 200 is obtained by either the proctor or the examinee 290 (FIG. 2) and arranged where the digital proctoring cameras 210, 220, 230 are oriented to capture video including predetermined features within the testing administration area. The concept of the present invention is to capture video of the examinee 290, the keyboard, any peripheral accessories used while taking the test, and the surrounding environment throughout the time allocated for administering the test or exam. The video feed from each digital proctoring camera 210, 220, 230 is forwarded to a proctor exam monitoring system 300 over a network 350 (FIG. 4). The proctor exam monitoring system 300 is best shown in FIG. 5.

In more detail, the proctoring acquisition system 200 is shown in a first exemplary arrangement about an exemplary test administering laptop computer 100, as illustrated in FIG. 1. The exemplary test administering laptop computer 100 includes a computer monitor frame 110 hingeably assembled to a laptop computer base 102 by at least one monitor hinge 119. A computer keyboard 104 is integrated into the laptop computer base 102. A computer input interface pointing device 106 can optionally be integrated into the laptop computer base 102. A display 112 is assembled within the computer monitor frame 110. Components associated with a portable computing system are integrated into the laptop computer base 102; these components can include a printed circuit board, at least one microprocessor, on board digital memory, a digital memory storage device, a portable power supply, various electronic components assembled to the printed circuit board, a display driver, at least communication circuit, at least one connector, a power charging circuit, an external power connector, an Ethernet connector and associated circuitry, and a video connector. In the exemplary embodiment, the test administering laptop computer 100 includes a Universal Serial Bus (USB) connector and associated circuitry. The computer input interface pointing device 106 can be a track pad (as shown), a trackball, or any other suitable pointer or digitizer.

Figure 2:
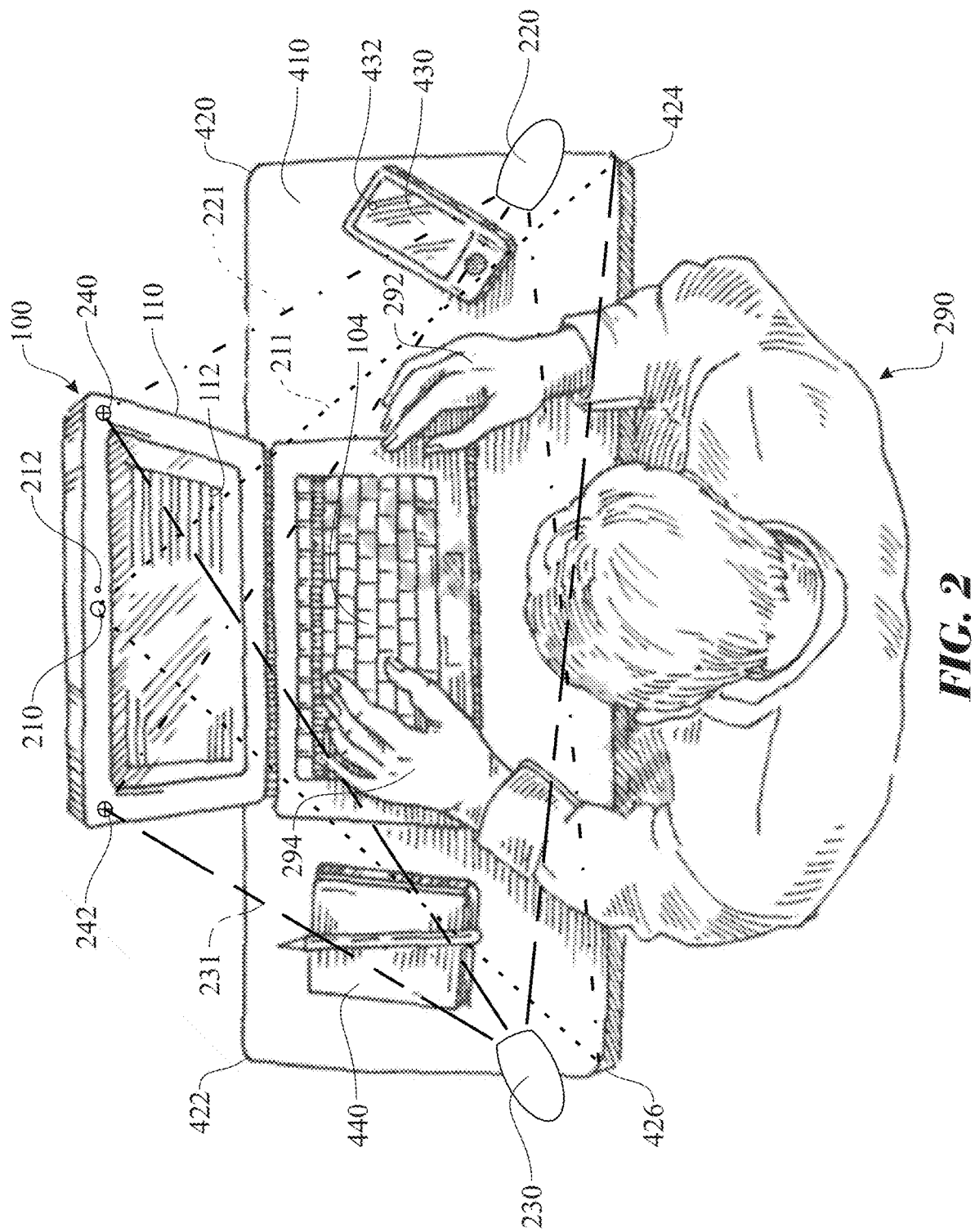
FIG. 2 presents an isometric top view of an exemplary test administration station employing the exemplary test proctoring system originally introduced in FIG. 1.

A first exemplary installation of the proctoring acquisition system 200 is illustrated in FIGS. 1 and 2. The proctoring acquisition system 200 is employed to monitor the examinee 290 during administration of a computer administered test. The proctoring acquisition system 200 can be supplies in a kit form to the proctor or the examinee 290. The proctoring acquisition system 200 can be arranged to utilize an integral webcam 210 and a microphone 212 integrated into the test administering laptop computer 100 or provided as a separate unit, such as the monitor mount digital proctoring camera 250 illustrated in FIGS. 3 and 7. The integral webcam 210 can be tested to ensure that a webcam field of view 211 of the integral webcam 210 is capable of obtaining video of the required area. If the integral webcam 210 is determined to be acceptable, the proctoring acquisition system 200 can utilize the integral webcam 210. Should it be determined that the integral webcam 210 is not acceptable, the monitor mount digital proctoring camera 250 can be employed. It is desired that the webcam field of view 211 would be capable of acquiring video of the examinee 290. The webcam field of view 211 would also be capable of acquiring video across the entire front edge of a testing workstation tabletop 410; extending between a testing workstation proximal right corner 424 and a testing workstation proximal left corner 426 of the testing workstation tabletop 410. The first digital proctoring camera 220 would be supported by a first digital proctoring camera stand 222. The first digital proctoring camera stand 222 can be a free standing design, a mounting design utilizing a clamp or other mounting system, employ a fixed mounting system such as a suction cup or other fixed mounting system, or any other suitable support system. The first digital proctoring camera stand 222 can include features to adjust a height of the first digital proctoring camera 220, an angle of the first digital proctoring camera 220, or any other adjustment enabling a change to an angle and/or viewing position of the first digital proctoring camera 220. A first digital proctoring camera power and data cable 224 would provide a power and signal connection between the first digital proctoring camera 220 and the test administering laptop computer 100. A first digital proctoring camera power and data cable connector 226, provided at a free end of the first digital proctoring camera power and data cable 224 would be inserted into a mating connector integrated within the laptop computer base 102. The first digital proctoring camera 220 would be located and oriented where a first digital proctoring camera field of view 221 acquires video of the entire display 112 of the test administering laptop computer 100, and preferably the entire computer keyboard 104 of the test administering laptop computer 100. The first digital proctoring camera field of view 221 can also be arranged to acquire video of the far side of the testing workstation tabletop 410 (respective to the location of the first digital proctoring camera 220), including acquiring video between a testing workstation distal left corner 422 and the testing workstation proximal left corner 426 of the testing workstation tabletop 410 as illustrated in FIG. 2. The second digital proctoring camera 230 is similar to the first digital proctoring camera 220. The second digital proctoring camera 230 would be employed in a condition where the first digital proctoring camera field of view 221 is inadequate for video coverage of the entire testing workstation tabletop 410.

The second digital proctoring camera 230 would be supported by a second digital proctoring camera stand 232. The second digital proctoring camera stand 232 can be a free standing design, a mounting design utilizing a clamp or other mounting system, employ a fixed mounting system such as a suction cup or other fixed mounting system, or any other suitable support system. The second digital proctoring camera stand 232 would be similar to the first digital proctoring camera stand 222 as described above. A second digital proctoring camera power and data cable 234, having a second digital proctoring camera power and data cable connector (not shown) at a free end thereof, would provide a power and signal connection between the second digital proctoring camera 230 and the test administering laptop computer 100 in a similar manner to the first digital proctoring camera power and data cable 224, as described above. The second digital proctoring camera 230 would be located and oriented where a second digital proctoring camera field of view 231 also acquires video of the entire display 112 of the test administering laptop computer 100, and preferably the entire computer keyboard 104 of the test administering laptop computer 100. The second digital proctoring camera field of view 231 can also be arranged to acquire video of the far side of the testing workstation tabletop 410 (respective to the location of the second digital proctoring camera 230), including acquiring video between a testing workstation distal right corner 420 and the testing workstation proximal right corner 424 of the testing workstation tabletop 410 as illustrated in FIG. 2.

The arrangement of the integral webcam 210, the first digital proctoring camera 220, and the second digital proctoring camera 230 provides a webcam field of view 211, a first digital proctoring camera field of view 221, and a second digital proctoring camera field of view 231 which collectively captures video of the entire test administration area, including the computer keyboard 104, the display 112, the working surface of the testing workstation tabletop 410, and the examinee 290. The integrated camera 432 can be used as one of the first digital proctoring camera 220, and the second digital proctoring camera 230 or added as a third digital proctoring camera 432.

The proctoring acquisition system 200 can include reference markers 260, 262, 264, 266, which would be temporarily applied to the test administering laptop computer 100. The first display reference marker 260 would be placed upon the upper, right corner of the computer monitor frame 110. Reference markers similar to reference markers 260, 262 can be placed upon the lower, right corner of the computer monitor frame 110 and the lower, left corner of the computer monitor frame 110. The second display reference marker 262 would be placed upon the upper, left corner of the computer monitor frame 110. The first keyboard reference marker 264 would be placed upon the front, right corner of the laptop computer base 102. The second keyboard reference marker 266 would be placed upon the front, left corner of the laptop computer base 102. Reference markers similar to reference markers 264, 266 can be placed upon the rear, right corner of the computer monitor frame 110 and the rear, left corner of the computer monitor frame 110.

Figure 3:
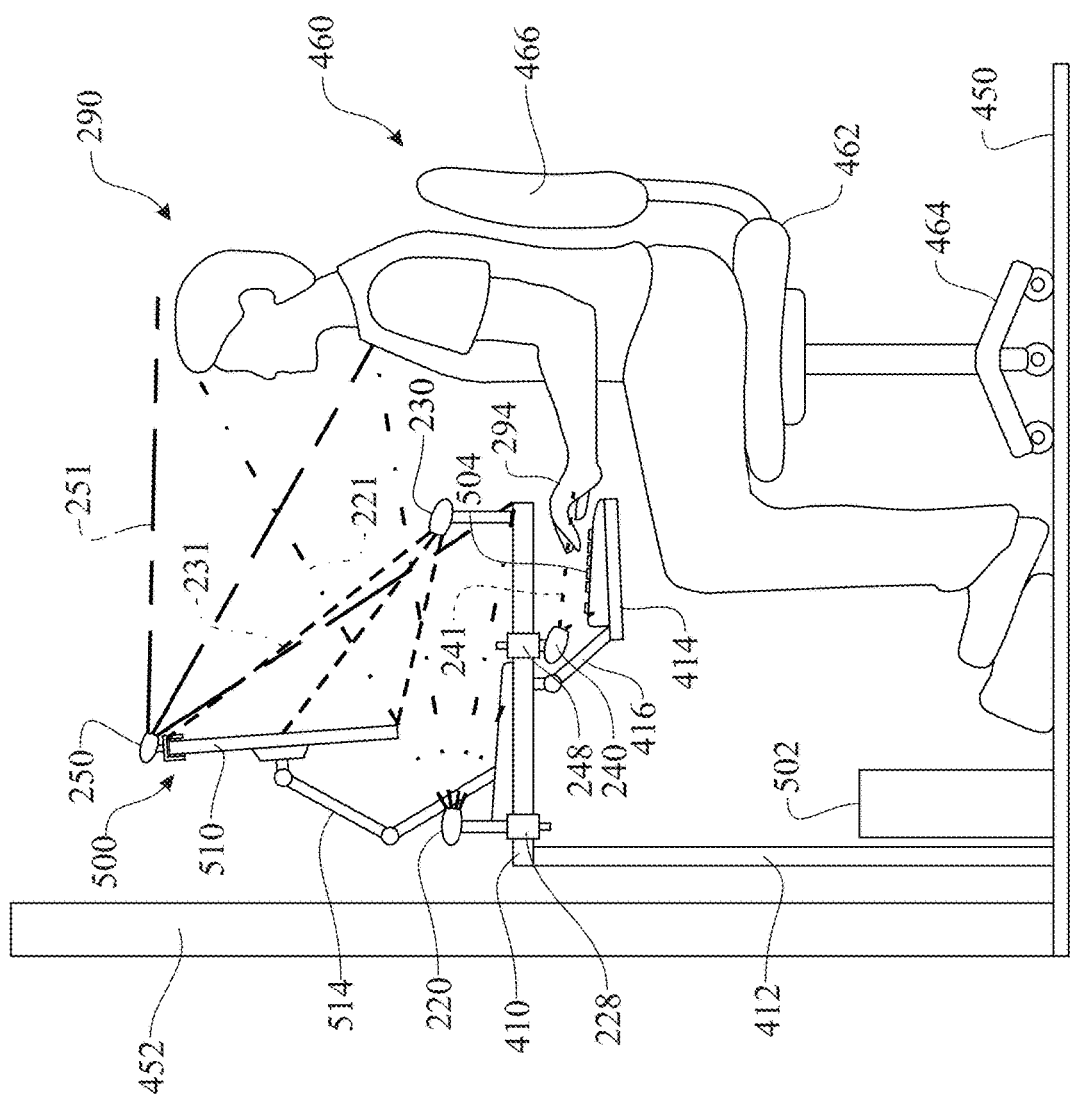
FIG. 3 presents an elevation, left side view of another exemplary test administration station employing a variation of the test proctoring system originally introduced in FIG. 1.

An alternative exemplary arrangement of the proctoring acquisition system 200 is illustrated in FIG. 3. The exemplary environment illustrated in FIG. 3 includes a floor 450, a wall 452 extending upward from the floor 450 and preferably located along a rear edge of the testing workstation tabletop 410. An examinee chair 460 is provided to support the examinee 290 during the testing process. The examinee chair 460 includes an examinee chair seat 462 supported by an examinee chair base 464. The examinee chair base 464 commonly includes rollers (as illustrated) enabling ease of movement on the floor 450. An examinee chair seat back 466 extends upwards from a rear portion of the examinee chair seat 462. The examinee 290 would remain seated within the examinee chair 460 throughout the duration of the test or, when the test is segmented, throughout each segment of the test.

In the exemplary arrangement illustrated in FIG. 3, a test administering desktop computer 502 is located on a floor 450. In other installations, the test administering desktop computer 502 can be placed upon a top surface of the testing workstation tabletop 410, mounted to an underside of the testing workstation tabletop 410, mounted to the testing workstation stand 412, mounted to the wall 452, or any other suitable installation. A monitor frame 510, providing a display from the test administering desktop computer 502, is supported by a monitor frame stand 514. The monitor frame stand 514 can be supported by a base, secured to the testing workstation tabletop 410, or secured to a wall 452. A computer keyboard 504 is supported by a testing workstation keyboard support platform 414, positionably attached to the testing workstation tabletop 410 by a testing workstation keyboard support assembly 416. The exemplary testing workstation keyboard support platform 414 is located below a plane of the testing workstation tabletop 410, which requires a different proctoring arrangement compared to the arrangement illustrated in FIG. 2. The testing workstation tabletop 410 is supported by a testing workstation stand 412, which is supported by the floor 450. Although the testing workstation tabletop 410 is illustrated as being supported by the testing workstation stand 412, the testing workstation tabletop 410 can be supported by the wall 452 or any other suitable support configuration. The placement of the testing workstation tabletop 410 against the wall 452 eliminates any potential for other persons to be situated behind the testing workstation tabletop 410, where the other person may be outside of the viewing area of all of the digital proctoring cameras 220, 230, 240, 250.

In the exemplary arrangement of the proctoring acquisition system 200, the first digital proctoring camera 220 is secured to the testing workstation tabletop 410 by a first digital proctoring camera mount 228 at a location proximate a rear of the testing workstation tabletop 410. The first digital proctoring camera 220 is oriented to acquire video of objects located within the first digital proctoring camera field of view 221, including the examinee 290. The first digital proctoring camera 220 can be oriented to also capture video images of the desktop of the testing workstation tabletop 410.

The second digital proctoring camera 230 is secured to the testing workstation tabletop 410 in a manner similar to the mounting of the first digital proctoring camera 220 at a location proximate a front edge of the testing workstation tabletop 410. The second digital proctoring camera 230 is oriented to acquire video of objects located within the second digital proctoring camera field of view 231, including a display of the monitor frame 510.

The third digital proctoring camera 240 is mounted to the testing workstation tabletop 410, using a third digital proctoring camera mount 248, at an orientation directing a third digital proctoring camera field of view 241 downward, towards the computer keyboard 504. This mounting enables the third digital proctoring camera 240 to capture video of all keystrokes provided by each hand 292, 294 of the examinee 290 even though the computer keyboard 504 is located below the surface of the testing workstation tabletop 410.

The monitor mount digital proctoring camera 250 is secured to an upper edge of the monitor frame 510 by a monitor mount digital proctoring camera frame grip 258 (FIG. 7) and supported by a monitor mount digital proctoring camera support member 252 extending between the monitor mount digital proctoring camera frame grip 258 and the monitor mount digital proctoring camera 250. The monitor mount digital proctoring camera 250 is oriented to acquire video of objects located within the monitor mount digital proctoring camera field of view 251, including the examinee 290. The first digital proctoring camera 220 (or a second digital proctoring camera 230, not shown) can be oriented to also capture video images of the desktop of the testing workstation tabletop 410.

A test administration network is presented in an illustration of FIG. 4. The exemplary illustration includes a first examinee testing station 100A, a second examinee testing station 100B, and an nth examinee testing station 100n, where the nth examinee testing station 100n is representative of any additional number of examinee testing stations 100. Each examinee testing station 100A, 100B, 100n would include an employment of a proctoring acquisition system 200. Each examinee testing station 100A, 100B, 100n would be connected to a proctor exam monitoring server 310 and a test administrating server 320 via a network controlling/routing system 350. The connectivity can be provided using any suitable protocol or mixture of protocols. For example, the first examinee testing station 100A can be connected to the network controlling/routing system 350 using an Ethernet connection over a wired connection, such as a landline, coaxial line, or a fiber optic line. The second examinee testing station 100B can be connected to the network controlling/routing system 350 using a wireless connection such as Wi-Fi to a modem, wherein the modem is connected to the network controlling/routing system 350 via a wired connection. The nth examinee testing station 100n can be connected to the network controlling/routing system 350 using a wireless connection such as a cellular connection, wherein the cellular connection provides communication directly or indirectly to the network controlling/routing system 350. The proctor exam monitoring server 310 includes all elements commonly known to be included within a network server, including a microprocessor, a proctor exam monitoring server digital storage media 312 in communication with the microprocessor, a communication circuit in communication with the microprocessor, and any other known elements associated with a network server or computer. Proctor exam monitoring software 316 is configured to run on or in conjunction with the proctor exam monitoring server 310.

The test administrating server 320 can be similar to the proctor exam monitoring server 310, where the test administrating server 320 also includes all elements commonly known to be included within a network server, including a microprocessor, a test administrating server digital storage media 322 in communication with the microprocessor, a communication circuit in communication with the microprocessor, and any other known elements associated with a network server or computer.

Proctor examinee station software 314 can be stored on the proctor exam monitoring server digital storage media 312 of the proctor exam monitoring server 310 or on the test administrating server digital storage media 322 of the test administrating server 320. Each examinee testing station 100A, 100B, 100n can access and optionally download the proctor examinee station software 314 from a source via the network. Alternatively, the proctor examinee station software 314 can be provided on a portable memory device, such as a Compact Disc (CD), a digital optical disc (DVD), a Universal Serial Bus (USB memory stick), a secure digital (SD) memory card, or any other portable digital memory storage device. The portable digital memory storage device can be included with the kit containing the digital proctoring cameras 220, 230, 240, 250.

Details of the proctor exam monitoring system 300 are presented in FIG. 5. Any number of examinee testing stations 100 are represented by the single illustrated examinee testing station 100. Each exemplary examinee testing station 100 is in data communication with the network controlling/routing system 350 using any known, suitable data communication protocol. The test administrating server 320 is also in data communication with the network controlling/routing system 350 using any known, suitable data communication protocol. Information from each exemplary examinee testing station 100 would be transferred to the proctor exam monitoring server 310 by the network controlling/routing system 350 over the network. The information can include video acquired by each of the digital proctoring cameras 210, 220, 230, 240, 250, keystroke information, peripheral entry information, screen display information, and any other information that can be captured by the proctor examinee station software 314. The received information can be processed by a proctor exam monitoring artificial intelligence software 318 either by the proctor exam monitoring server 310 or by a different processing device to determine if any anomalies occur during the administration of the test. Prior to initiating the test taking process, the proctoring system can request that the examinee 290 provide scanned copies of all paper products or documents 440 that are in a proximity of and might be used by the examinee 290 during the test. Additionally, prior to initiating the test taking process, the proctoring system can request that the examinee 290 present all electronic devices 430 that are in a proximity of and might be used by the examinee 290 during the test. The proctor exam monitoring artificial intelligence software 318 can utilize the information provided by the Examinee 290 prior to initiating the test with paper products or documents 440 and electronic devices 430 used during the administration period of the exam to determine any potential anomalies. Should the proctor exam monitoring artificial intelligence software 318 determine a potential anomaly occurs, the proctor exam monitoring artificial intelligence software 318 can initiate an alert to inform the live proctor of the potential anomaly. The alert can be in any suitable form, including an audible alert, a visual alert, such as a first examinee artificial intelligence alert 338A, a tactile alert that can be carried or worn by the proctor, a combination of two or more alerts, or any other suitable alert.

The Examinee 290 can utilize any of the cameras, 210, 220, 230, or an integrated camera 432 (for example, a camera integrated into the Smartphone or electronic device 430) to use a video conferencing application, such as a ZOOM® app or GOOGLE® hangouts to record the work space of the Examinee 290. This can be included as a requirement initiated by the proctoring company.

Proctor exam monitoring software 316 can be employed to receive each of the video data captured by each proctoring acquisition system 200 employed by each respective test administering laptop computer 100. The collected video is presented on a proctoring monitor display 313 of a proctoring monitor 311 in any visually reasonable organization. In the exemplary illustration, video data captured from each of the digital proctoring cameras 210, 220, 230, 240, 250 from each examinee testing station 100 is presented in a cluster. Each cluster is identified by a different suffix, A, B, n. The cluster associated with the Examinee 1 is identified by a suffix "A". The cluster associated with the Examinee 2 is identified by a suffix "B". The cluster associated with each additional Examinee n of any number of examinees is identified by a suffix "n". Each cluster can be presented within an examinee monitoring window 330A, 330B, 330n. Using the cluster associated with the Examinee 1 (identified by a suffix "A") as being exemplary for each of the three exemplary clusters, the cluster is identified by a first examinee identifier 331A. Video provided by a first digital proctoring camera 210, 220, 230, 240, 250 is displayed in a first examinee monitoring window first camera video 332A. Video provided by a second digital proctoring camera 210, 220, 230, 240, 250 is displayed in a first examinee monitoring window second camera video 334A. Video provided by an nth digital proctoring camera 210, 220, 230, 240, 250 is displayed in a first examinee monitoring window nth camera video 336A. In the exemplary cluster, an anomaly has been identified by the proctor exam monitoring artificial intelligence software 318 and the proctor exam monitoring artificial intelligence software 318 has activated an alert, represented in FIG. 5 by a first examinee artificial intelligence alert 338A. The first examinee artificial intelligence alert 338A is representative of any visual alert, audible alert, or any other suitable alert.

The number of clusters would preferably be limited to ensure that the number of video feeds would not overwhelm an individual proctor. It is also understood that the video can be recorded, allowing a display of additional video feeds to the proctor, where the thoroughness of the proctor can be supplemented by reviewing the video in either real time and/or reviewing the recorded video.

The test administrating software 324 can be utilized for any of a number of functions. A first exemplary function is a generation of a test or exam. The test can be created as a serialized group of tests, where each test is uniquely identified and includes a common set of test questions or instructions, while the set of test questions or instructions are presented in a unique order when compared to an order of the set of test questions or instructions of other serialized tests. Alternatively, the set of test questions or instructions included in each serialized test can be a subset of a larger or overall set of test questions or instructions. The subset of the larger or overall set of test questions or instructions can be presented in the same order as established by the larger or overall set of test questions or instructions or presented in different orders. The test administrating software 324 can create and maintain an index associating each serialized test with a respective examinee 290. In one example, each examinee 290 can include an identifier, which would be associated with the serialized test. In a second example, a Media Access Control (MAC) address of the test administering laptop computer 100 used by the examinee 290 can be used as the identifier, which would be associated with the serialized test. In a third example, an Internet Protocol (IP) address of the test administering laptop computer 100 used by the examinee 290 can be used as the identifier, which would be associated with the serialized test. The distribution of each test or exam can be provided via the network controlling/routing system 350.

During the administration of the test, the proctor would monitor each video feed to ensure against any improprieties. Should the proctor need, the proctor can rewind the video, enlarge the video, or use any other suitable technique to determine if the examinee 290 is potentially or actually cheating. The proctor exam monitoring software 316 can enable the proctor to mark, edit, annotate or any other method identify a portion of the video which appears to indicate an impropriety of one or more examinees 290. The proctoring can be enhanced by employing proctor exam monitoring artificial intelligence software 318, of which certain features have been described above. In addition to the previously presented functions provided by the proctor exam monitoring artificial intelligence software 318, the proctor exam monitoring artificial intelligence software 318 can additionally audit characters displayed on the display 112 and compare the characters displayed with the recorded keystrokes. The system can additionally utilize timestamps to ensure that the displayed characters and the recorded keystrokes are properly synchronized. The proctor exam monitoring artificial intelligence software 318 can monitor for anomalies in any background sounds recorded by the microphone 212. The proctor exam monitoring artificial intelligence software 318 can determine is a second person is within the area of the examinee 290. In general, the proctor exam monitoring artificial intelligence software 318 can be programmed to identify any reasonable anomaly using the information provided by the proctoring acquisition system 200.

Figure 6:
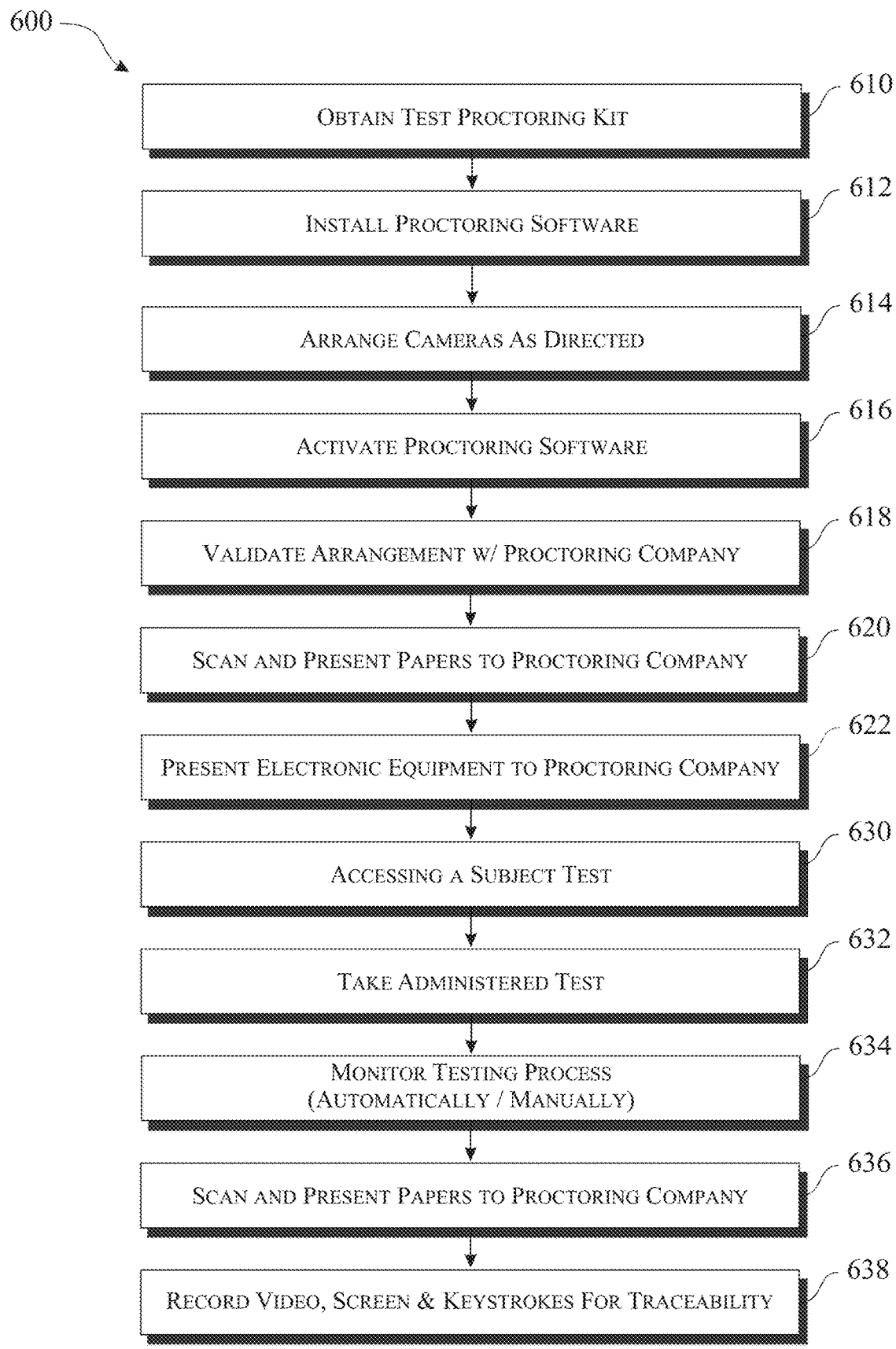
FIG. 6 presents an exemplary flow diagram illustrating steps for administering and proctoring a test.

A test proctoring method 600, presented in FIG. 6, describes an exemplary method of installing and using the proctoring acquisition system 200. The test proctoring method 600 initiates with a step of obtaining a kit containing the proctoring acquisition system 200 (step 610). The proctor examinee station software 314 is installed (or remotely accessed for use during a test administration period) on the test administering laptop computer 100 (step 612). The proctoring acquisition system 200 includes at least one digital proctoring camera 220, 230, 240, 250. An integral webcam 210 (integrated within the test administering laptop computer 100) can be employed as a digital proctoring camera during the text administration period. The at least one digital proctoring camera 220, 230, 240, 250 and/or the integral webcam 210 to include at least two (2) total digital proctoring cameras 210, 220, 230, 240, 250 would be arranged to capture the desired video within the respective digital proctoring camera field of view 211, 221, 231, 241, 251 (step 614). Details of exemplary arrangements of the at least two (2) total digital proctoring cameras 210, 220, 230, 240, 250 are presented above. The purpose of the at least two (2) total digital proctoring cameras 210, 220, 230, 240, 250 is to capture continuous video of the examinee 290; capture continuous video of movements of the examinee's hands 292, 294 on the computer keyboard 104; 504; capture continuous video of activity on the display 112, capture a time from a displayed clock or other indicator of time, capture continuous video of a desk top to determine, what, if any, papers, electronics, or other items are used to aid the examinee in taking the test; and the like.

Once the at least two (2) total digital proctoring cameras 210, 220, 230, 240, 250 are assumed to be arranged properly, the proctor examinee station software 314 can be activated (step 616). The activated proctor examinee station software 314 would activate each of the at least two (2) total digital proctoring cameras 210, 220, 230, 240, 250 and capture a sample video from each of the at least two (2) total digital proctoring cameras 210, 220, 230, 240, 250. The captured sample video would be forwarded to the proctor exam monitoring system 300 for validation. The proctor exam monitoring system 300 would then validate the arrangement of the at least two (2) total digital proctoring cameras 210, 220, 230, 240, 250 based upon a review of the captured sample video provided by the proctor examinee station software 314 from the test administering laptop computer 100 of the examinee 290 (step 618). The validation can be processed by the proctor exam monitoring software 316, the proctor exam monitoring artificial intelligence software 318 or a proctor. Upon validation, the proctor examinee station software 314 would receive an appropriate notification. Should the arrangement be deemed inadequate, the proctor examinee station software 314 would receive an appropriate notification and inform the examinee 290 accordingly. In a preferred process, the proctor examinee station software 314 would include feedback and instructions to the examinee 290 to aid in steps to correct the arrangement of the at least two (2) total digital proctoring cameras 210, 220, 230, 240, 250. In a condition where the arrangement as deemed to be inadequate, the validation process (step 618) would be repeated until the arrangement is considered to be acceptable.

The preparations can include a step of directing the examinee 290 to digitize (such as by scanning, photographing, and the like) each page of each paper product or document 440 that may be used while taking the test or exam. The digitized images of the paper product or document 440 would be presented to the proctor exam monitoring system 300 using any suitable presentation process, including email, uploading to a website, utilizing any of the at least two (2) total digital proctoring cameras 210, 220, 230, 240, 250, or any other suitable presentation method (step 620).

The preparations can additionally include a step of directing the examinee 290 to activate and present each electronic device 430 to the proctor exam monitoring system 300. This can be accomplished by activating each electronic device 430 and locating a display of each electronic device 430 within a field of view of any of the at least two (2) total digital proctoring cameras 210, 220, 230, 240, 250 (step 622).

At this point, the test administering laptop computer 100 is suitably prepared to administer the test or exam. The test or exam can be acquired from the test administrating server digital storage media 322 of the test administrating server 320 using the test administrating software 324 (step 630). The test or exam can be run on a remote system, where the test administering laptop computer 100 would function as a workstation or the test or exam can be downloaded to the test administering laptop computer 100, then run on the test administering laptop computer 100.

At this point, the examinee 290 is ready to commence with taking the test (step 632). The examinee 290 would begin taking the test or exam upon receiving instructions to do so. This may be implemented when the administration of the test is conducted over a timed test administration period. The examinee 290 would provide answers and/or responses to each question or instruction presented by the test over the administration time period. During this time, the at least two (2) total digital proctoring cameras 210, 220, 230, 240, 250 and the microphone 212 would capture video and audio and provide the captured video and audio to the proctor exam monitoring system 300 for monitoring (634) using the monitoring practices described herein. Any identified improprieties can be documented by the proctor exam monitoring system 300 in a manner to associate the identified improprieties with the respective examinee 290. The documented improprieties can be further reviewed to determine if any action resulting from the documented improprieties is required. Upon completion of the test, the examinee 290 can repeat the step of directing the examinee 290 to digitize (such as by scanning, photographing, and the like) each page of each paper product or document 440 that was available for use while taking the test or exam to determine if any notes were taken or if any other potential impropriety occurred (step 636). The provided scans would be saved for documentation. The proctor exam monitoring system 300 can additionally save the video captured by the at least two (2) total digital proctoring cameras 210, 220, 230, 240, 250 and provided to the proctor exam monitoring system 300, save the screen capture recordings, save the digitally recorded keystrokes, and save any and all other provided information for traceability (step 638). Although the test proctoring method 600 presents a series of steps, the illustrated test proctoring method 600 is only exemplary and it is understood that the order of the steps may differ, the process may include or exclude one or more steps, the process of executing any step may differ from the description presented herein, and the like.

The field of view of the digital proctoring cameras 210, 220, 230, 240, 250 may be limited to an area that is unacceptable to adequately monitor a test administrating station, such as the test administrating station illustrated in FIG. 2 or the test administrating station illustrated in FIG. 3. It is known that examinees have obtain support from other individuals while taking computer administered tests or exams. The field of view of the digital proctoring cameras 210, 220, 230, 240, 250 may limit the captured video where an aiding individual can remain out of view of the field of view of the digital proctoring cameras 210, 220, 230, 240, 250.

Figure 7:
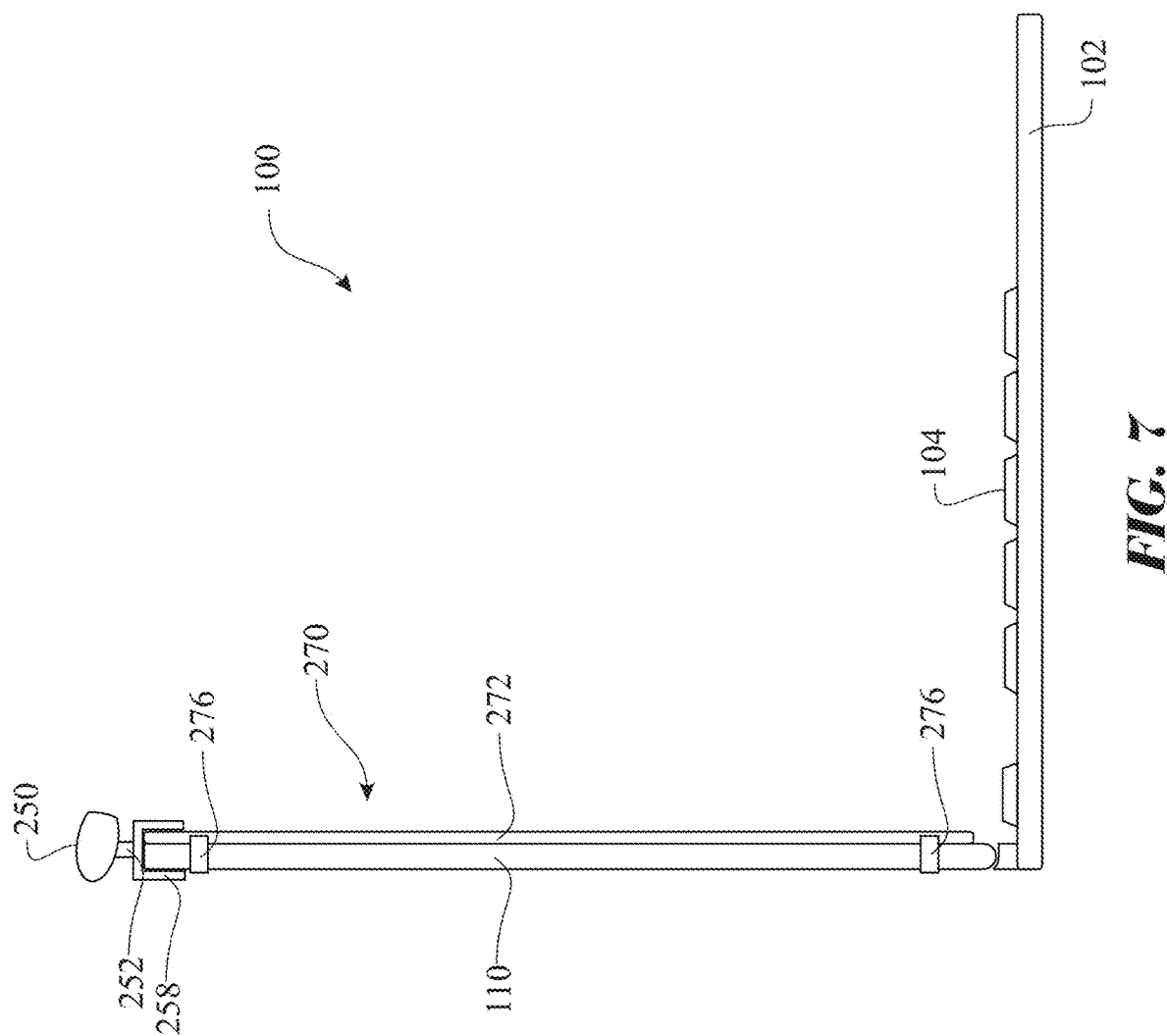
FIG. 7 presents a side elevation view of an exemplary test administration system as introduced in FIG. 1, the exemplary test administration system further comprising a privacy screen.
Figure 8:
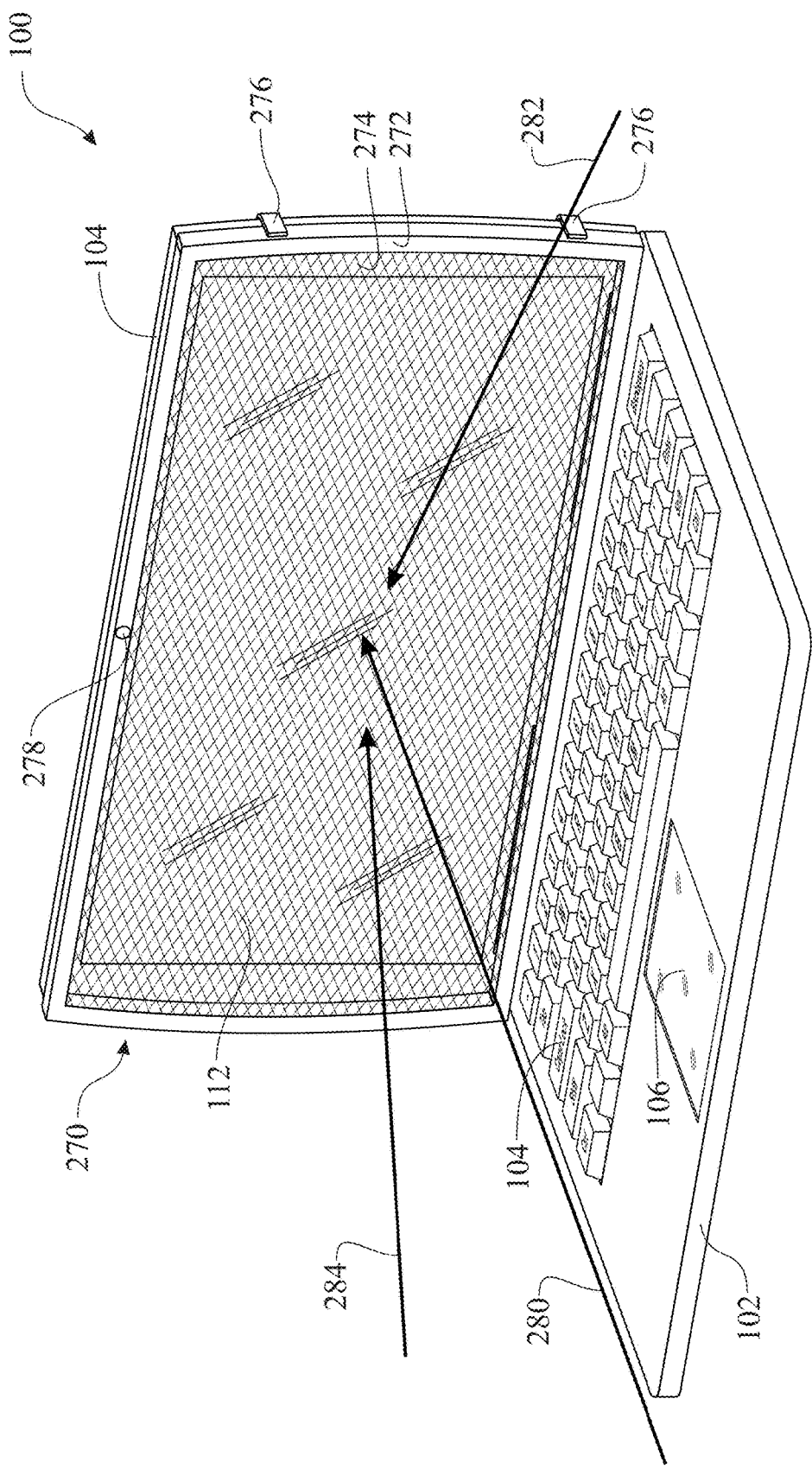
FIG. 8 presents a front, right side isometric view of the exemplary test administration system introduced in FIG. 7.

The proctoring acquisition system 200 can additionally include a privacy filter 270, introduced in FIGS. 7 and 8. The privacy filter 270 can be provided in conjunction with the digital proctoring cameras 220, 230, 240, 250 and proctor examinee station software 314. The privacy filter 270 includes a privacy filter screen 274 supported by a privacy filter frame 272. The privacy filter screen 274 is preferably sized having a width and height that is substantially similar to or greater than a width and height of the display 112. The privacy filter frame 272 is preferably sized having a width and height that is similar to a width and height of the computer monitor frame 110. The privacy filter frame 272 can be rectangular in shape or following any shaping of the computer monitor frame 110. It is understood that the privacy filter 270 would be configured for multiple monitors of a like size classification and therefore may not follow a peripheral shape of the computer monitor frame 110. The privacy filter 270 can be secured to the computer monitor frame 110 using any suitable temporary attachment interfaces, including a privacy filter retention member 276 (as illustrated), a ribbon, an adhesive, a double sided tape, a clamp, or any other suitable temporary attachment interface.

The privacy filter screen 274 of the privacy filter 270 permits a viewing area between a privacy filter right viewing angle limit 282 and a privacy filter left viewing angle limit 284. This enables the examinee 290 to view images displayed on the display 112, such as via a privacy filter examinee viewing angle 280, but restricts any viewing of images displayed on the display 112 from an angle greater than the privacy filter right viewing angle limit 282 or the privacy filter left viewing angle limit 284.

The privacy filter 270 can include a privacy filter webcam aperture 278 to accommodate the integral webcam 210. Alternatively, a monitor mount digital proctoring camera 250 can be installed where the monitor mount digital proctoring camera frame grip 258 can straddle both, the computer monitor frame 110 and the privacy filter frame 272, as shown in FIG. 7.

The information on the display 112 can be captured by positioning the digital proctoring cameras 220, 230 within the angles defined by the privacy filter right viewing angle limit 282 and the privacy filter left viewing angle limit 284. Alternatively, or in conjunction, the information displayed on the display 112 can be captured using screen capturing or replicating software, which would replicate the information displayed on the display 112.

Although the illustrations present several exemplary arrangements for a test proctoring system 200, it is understood that the test proctoring system can be implemented in any of a variety of arrangements to achieve the desired results of capturing information presented on the display 112, actions of the examinee 290, keystrokes of the computer keyboard 104, use of materials (documents, electronic devices, peripheral devices, and the like) on the testing workstation tabletop 410, timestamps for synchronization, activity within an environment of the test administrating station 100, and the like.

The system can be adapted for use with test administering computers 100, 502 utilizing multiple computer displays. The proctor examinee station software 314 can capture video from each of the multiple computer displays. The digital proctoring cameras 220, 230 can be arranged to acquire video of each or all of the multiple computer displays. The process can include a step of utilizing one or more of the digital proctoring cameras 220, 230 to acquire and submit video of the entire environment to ensure that any unauthorized items are not within the test administration area.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

REF NO. DESCRIPTION

- 100 test administering laptop computer
- 100A first examinee testing station
- 100B second examinee testing station
- 100n nth examinee testing station
- 102 laptop computer base
- 104 computer keyboard
- 106 computer input interface pointing device
- 110 monitor frame
- 112 display
- 119 monitor hinge
- 200 proctoring acquisition system
- 210 integral webcam
- 211 webcam field of view
- 212 microphone
- 220 first digital proctoring camera
- 221 first digital proctoring camera field of view
- 222 first digital proctoring camera stand
- 224 first digital proctoring camera power and data cable
- 226 first digital proctoring camera power and data cable connector
- 228 first digital proctoring camera mount
- 230 second digital proctoring camera
- 231 second digital proctoring camera field of view
- 232 second digital proctoring camera stand
- 234 second digital proctoring camera power and data cable
- 240 third digital proctoring camera
- 241 third digital proctoring camera field of view
- 248 third digital proctoring camera mount
- 250 monitor mount digital proctoring camera
- 251 monitor mount digital proctoring camera field of view
- 252 monitor mount digital proctoring camera support member
- 258 monitor mount digital proctoring camera frame grip
- 260 first display reference marker
- 262 second display reference marker
- 264 first keyboard reference marker
- 266 second keyboard reference marker
- 270 privacy filter
- 272 privacy filter frame
- 274 privacy filter screen
- 276 privacy filter retention member
- 278 privacy filter webcam aperture
- 280 privacy filter examinee viewing angle
- 282 privacy filter right viewing angle limit
- 284 privacy filter left viewing angle limit
- 290 examinee
- 292 examinee right hand
- 294 examinee left hand
- 300 proctor exam monitoring system
- 310 proctor exam monitoring server
- 311 proctoring monitor
- 312 proctor exam monitoring server digital storage media
- 313 proctoring monitor display
- 314 proctor examinee station software
- 316 proctor exam monitoring software
- 318 proctor exam monitoring artificial intelligence software
- 320 test administrating server
- 322 test administrating server digital storage media
- 324 test administrating software
- 330A first examinee monitoring window
- 331A first examinee identifier
- 332A first examinee monitoring window first camera video
- 334A first examinee monitoring window second camera video
- 336A first examinee monitoring window nth camera video
- 338A first examinee artificial intelligence alert
- 330B second examinee monitoring window
- 331B second examinee identifier
- 332B second examinee monitoring window first camera video
- 334B second examinee monitoring window second camera video
- 336B second examinee monitoring window nth camera video
- 338B second examinee artificial intelligence alert
- 331n nth examinee identifier
- 332n nth examinee monitoring window first camera video
- 334n nth examinee monitoring window second camera video
- 336n nth examinee monitoring window nth camera video
- 338n nth examinee artificial intelligence alert
- 350 network controlling/routing system
- 410 testing workstation tabletop
- 412 testing workstation stand
- 414 testing workstation keyboard support platform
- 416 testing workstation keyboard support assembly
- 420 testing workstation distal right corner
- 422 testing workstation distal left corner
- 424 testing workstation proximal right corner
- 426 testing workstation proximal left corner
- 430 electronic device
- 432 integrated camera
- 440 paper product
- 450 floor
- 452 wall
- 460 examinee chair
- 462 examinee chair seat
- 464 examinee chair base
- 466 examinee chair seat back
- 502 test administering desktop computer
- 504 computer keyboard
- 510 monitor frame
- 514 monitor frame stand
- 600 test proctoring method
- 610 obtain test proctoring kit
- 612 install proctoring software on examinee computer
- 614 arrange proctoring cameras as directed
- 616 activate proctoring software on examinee computer
- 618 validate arrangement of proctoring kit with proctoring company
- 620 scan and present papers to proctoring company (prior to exam)
- 622 present electronic devices to proctoring company
- 630 download subject test 632 complete test
634 monitor testing process
636 scan and present papers to proctoring company (after exam)
638 record and store video, screen, and keystrokes for traceability

What is claimed is:

1. A proctoring system for proctoring an examinee during administration of a test, comprising:
a test proctoring kit, the test proctoring kit comprising:
a first digital proctoring camera in one of direct or indirect digital communication with a proctor computer; and
a second digital proctoring camera in one of direct or indirect digital communication with the proctor computer,
wherein the first digital proctoring camera is positioned enabling acquisition of video of an examinee's keyboard and a portion of the examinee, including at least one of (a) an examinee's face and (b) at least one of an examinee's hands, wherein the first digital proctoring camera is arranged to capture video using a first viewing angle,
wherein the second digital proctoring camera is positioned enabling acquisition of video of images generated by an examinee's computer and displayed on a screen of a monitor and at least a portion of a desk supporting the examinee's keyboard, wherein the second digital proctoring camera is arranged to capture video using a second viewing angle,
the proctoring system employing monitoring steps of:
accessing proctoring software;
initiating the proctoring software;
acquiring a first video using the first digital proctoring camera;
conveying the first video acquired using the first digital proctoring camera to the proctor computer;
acquiring a second video using the second digital proctoring camera;
conveying the second video acquired using the second digital proctoring camera to the proctor computer; and
auditing characters displayed on the screen of the monitor and comparing the characters displayed on the screen of the monitor with recorded keystrokes obtained from the video of the examinee's keyboard to confirm that the data is entered by the examinee,
wherein the monitoring steps are accomplished by at least one of (a) a processor integral with the examinee's computer and (b) a processor integral with the proctoring computer,
wherein the first video and the second video are acquired simultaneously and the first video and the second video are presented to the proctor computer synchronized with one another in a cluster format.

2. The proctoring system for proctoring the examinee during administration of the test as recited in claim 1, wherein the first digital proctoring camera is positioned enabling acquisition of video of the examinee's keyboard and the portion of the examinee, including (a) the examinee's face and (b) at least one of the examinee's hands.

3. The proctoring system for proctoring the examinee during administration of the test as recited in claim 1, wherein the first digital proctoring camera is positioned enabling acquisition of video of the examinee's keyboard and the portion of the examinee, including (a) the examinee's face and (b) both of the examinee's hands.

4. The proctoring system for proctoring the examinee during administration of the test as recited in claim 1, wherein the second digital proctoring camera is positioned enabling acquisition of video of at least one of the examinee's hands.

5. The proctoring system for proctoring the examinee during administration of the test as recited in claim 1, wherein the second digital proctoring camera is positioned enabling acquisition of video of the keyboard and at least one of the examinee's hands.

6. The proctoring system for proctoring the examinee during administration of the test as recited in claim 1, wherein the second digital proctoring camera is positioned enabling acquisition of video of the keyboard and both of the examinee's hands.

7. A proctoring system for proctoring an examinee during administration of a test, comprising:
a test proctoring kit, the test proctoring kit comprising:
a first digital proctoring camera in one of direct or indirect digital communication with a proctor computer;
a second digital proctoring camera in one of direct or indirect digital communication with the proctor computer; and
a third digital proctoring camera in one of direct or indirect digital communication with the proctor computer,
wherein the first digital proctoring camera is positioned enabling acquisition of video of an examinee's keyboard and a portion of the examinee, including at least one of (a) an examinee's face and (b) at least one of an examinee's hands,
wherein the second digital proctoring camera is positioned enabling acquisition of video of images generated by an examinee's computer and displayed on a screen of a monitor and at least a portion of a desk supporting the examinee's keyboard, wherein the second digital proctoring camera is arranged to capture video using a first viewing angle;
wherein the third digital proctoring camera is positioned enabling acquisition of video of the images generated by the examinee's computer and displayed on the screen of the monitor and at least a second portion of the desk supporting the examinee's keyboard, wherein the third digital proctoring camera is arranged to capture video using a second viewing angle;
the proctoring system employing monitoring steps of:
accessing proctoring software;
initiating the proctoring software;
acquiring a first video using the first digital proctoring camera;
conveying the first video acquired using the first digital proctoring camera to the proctor computer;
acquiring a second video using the second digital proctoring camera;
conveying the second video acquired using the second digital proctoring camera to the proctor computer;
acquiring a third video using the third digital proctoring camera;
conveying the third video acquired using the third digital proctoring camera to the proctor computer; and
auditing characters displayed on the screen of the monitor and comparing the characters displayed on the screen of the monitor with recorded keystrokes obtained from the video of the examinee's keyboard to confirm that the data is entered by the examinee, wherein the monitoring steps are accomplished by at least one of (a) a processor integral with the examinee's computer and (b) a processor integral with the proctoring computer, wherein the first video, the second video and the third video are acquired simultaneously and the first video, the second video and the third video are presented to the proctor computer synchronized with one another in a cluster format.

8. The proctoring system for proctoring the examinee during administration of the test as recited in claim 7, wherein the first digital proctoring camera is positioned enabling acquisition of video of the examinee's keyboard and the portion of the examinee, including (a) the examinee's face and (b) at least one of the examinee's hands.

9. The proctoring system for proctoring the examinee during administration of the test as recited in claim 7, wherein the first digital proctoring camera is positioned enabling acquisition of video of the examinee's keyboard and the portion of the examinee, including (a) the examinee's face and (b) both of the examinee's hands.

10. The proctoring system for proctoring the examinee during administration of the test as recited in claim 7, wherein at least one of the second digital proctoring camera and the third digital proctoring camera is positioned enabling acquisition of video of at least one of the examinee's hands.

11. The proctoring system for proctoring the examinee during administration of the test as recited in claim 7, wherein at least one of the second digital proctoring camera and the third digital proctoring camera is positioned enabling acquisition of video of the keyboard and at least one of the examinee's hands.

12. The proctoring system for proctoring the examinee during administration of the test as recited in claim 7, wherein at least one of the second digital proctoring camera and the third digital proctoring camera is positioned enabling acquisition of video of the keyboard and both of the examinee's hands.

13. A method of use for proctoring an examinee during administration of a test, the method comprising steps of:
   obtaining a test proctoring kit, the test proctoring kit comprising:
      a first digital proctoring camera arranged to have digital communication with a proctor monitoring system, and
      a second digital proctoring camera arranged to have digital communication with the proctor monitoring system;
   arranging the first digital proctoring camera in an orientation to capture video of an examinee's keyboard and a portion of the examinee, the portion of the examinee including at least one of an examinee's hands and an examinee's face in the same frames of the captured video;
   arranging the second digital proctoring camera in an orientation to capture video of images generated by an examinee's computer and displayed on a screen of a monitor and at least a portion of a desk supporting the examinee's keyboard;
   accessing proctoring software;
   initiating the proctoring software,
   capturing a first video comprising the examinee's keyboard and the portion of the examinee using the first digital proctoring camera;
   capturing a second video comprising the images generated by the examinee's computer and displayed on the screen of the monitor using the second digital proctoring camera; and
   auditing characters displayed on the screen of the monitor and comparing the characters displayed on the screen of the monitor with recorded keystrokes obtained from the video of the examinee's keyboard to confirm that the data is entered by the examinee,
   wherein the captured first video comprising the examinee's keyboard and the portion of the examinee and the captured second video comprising the images generated by the examinee's computer and displayed on the screen of the monitor are acquired simultaneously and presented to the proctor computer synchronized with one another in a cluster format.

14. The method of use for proctoring the examinee during administration of the test as recited in claim 13, wherein the step of arranging the first digital proctoring camera in an orientation to capture video of the examinee's keyboard and a portion of the examinee, including at least one of the examinee's hands and the examinee's face arranges the first digital proctoring camera in the orientation to capture video of the examinee's keyboard and the portion of the examinee, including each of the examinee's hands and the examinee's face.

15. The method of use for proctoring the examinee during administration of the test as recited in claim 13, further comprising a step of arranging a third digital proctoring camera in an orientation to capture video of the images generated by the examinee's computer and displayed on the screen of the monitor and at least a portion of the desk supporting the examinee's keyboard,
   wherein the second digital proctoring camera is arranged to capture video using a first viewing angle,
   wherein the third digital proctoring camera is arranged to capture video using a second viewing angle,
   wherein the first viewing angle and the second viewing angle differ from one another.

16. The method of use for proctoring the examinee during administration of the test as recited in claim 13, further comprising a step of utilizing artificial intelligence by a processor of the proctor monitor system to identify improprieties during administration of the test.

17. The method of use for proctoring the examinee during administration of the test as recited in claim 13, further comprising a step of distributing the test from an examination computer to each examinee's computer via a commonly accessible network.

18. The method of use for proctoring the examinee during administration of the test as recited in claim 13, further comprising a step of obtaining a digital copy of notes for use by the examinee and providing the digital copy of the notes to the proctor monitor system, wherein the step of obtaining the digital copy of the notes is accomplished by at least one of:
   electronically scanning each page of the notes,
   using a digital camera to obtain a digital image of each page of the notes, and
   determining an electronic address comprising a stored digital file.

19. The method of use for proctoring the examinee during administration of the test as recited in claim 13, further comprising a step of obtaining the digital copy of the notes for use by the examinee and providing the digital copy of the notes to the proctor monitor system.

20. The method of use for proctoring the examinee during administration of the test as recited in claim 13, wherein a privacy filter screen is placed over a display of the examinee's computer, the method further comprising a step of distributing the test from an examination computer to each examinee's computer via a commonly accessible network.

\* \* \* \* \*